United States Patent [19]

Asbury et al.

[11] Patent Number: 5,189,426
[45] Date of Patent: Feb. 23, 1993

[54] DOPPLER FREQUENCY SPECTRUM DE-EMPHASIS FOR AUTOMOTIVE COLLISION AVOIDANCE RADAR SYSTEM

[75] Inventors: Jimmie Asbury, San Diego; John W. Davis, Encinitas, both of Calif.

[73] Assignee: IVHS Technologies, Inc., San Diego, Calif.

[21] Appl. No.: 756,176

[22] Filed: Sep. 6, 1991

Related U.S. Application Data

[63] Continuation-in-part of Ser. No. 695,951, May 6, 1991, abandoned.

[51] Int. Cl.⁵ .............................................. G01S 13/60
[52] U.S. Cl. ..................................... 342/70; 342/101; 342/114
[58] Field of Search ..................................... 342/70–72, 342/114, 98, 99, 101, 27, 28, 205, 91, 92, 159

[56] References Cited

U.S. PATENT DOCUMENTS 3,176,294 3/1965 Merlo et al. .
3,576,564 4/1971 Galvin .
3,742,497 6/1973 Sato et al. .
4,129,856 12/1978 Humphries et al. .
4,236,140 11/1980 Aker et al. .

Primary Examiner—Giberto Barrón, Jr.
Attorney, Agent, or Firm—Spensley Horn Jubas & Lubitz

[57] ABSTRACT

A Doppler control circuit for a CW or pulse Doppler radar system for monitoring not only the phase shift between echo signals from several targets but also the amplitude difference between the several targets and to further tune the radar to a particular target among one or more targets from which echo signals return. The control circuit can be used in state of the art CW or pulse Doppler type radar systems. In a further system, a special circuit is provided for conditioning selected portions of the Doppler frequency spectrum to attenuate or de-emphasize portions of the echo signal corresponding to selected targets in the radar system environment, such as rain or stationary wayside objects, in order to give such echo signals less weight in determining roadway hazards.

17 Claims, 18 Drawing Sheets

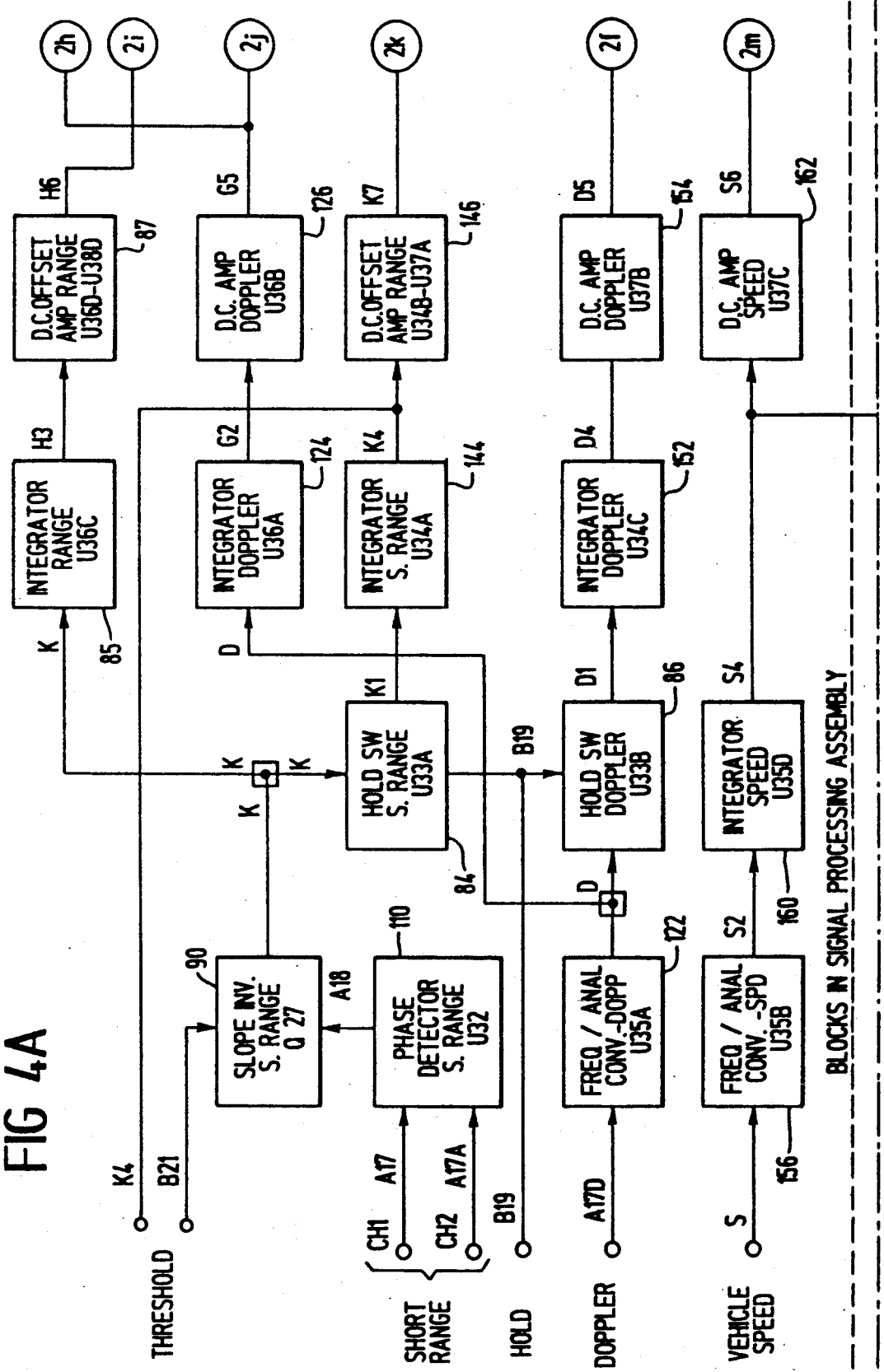

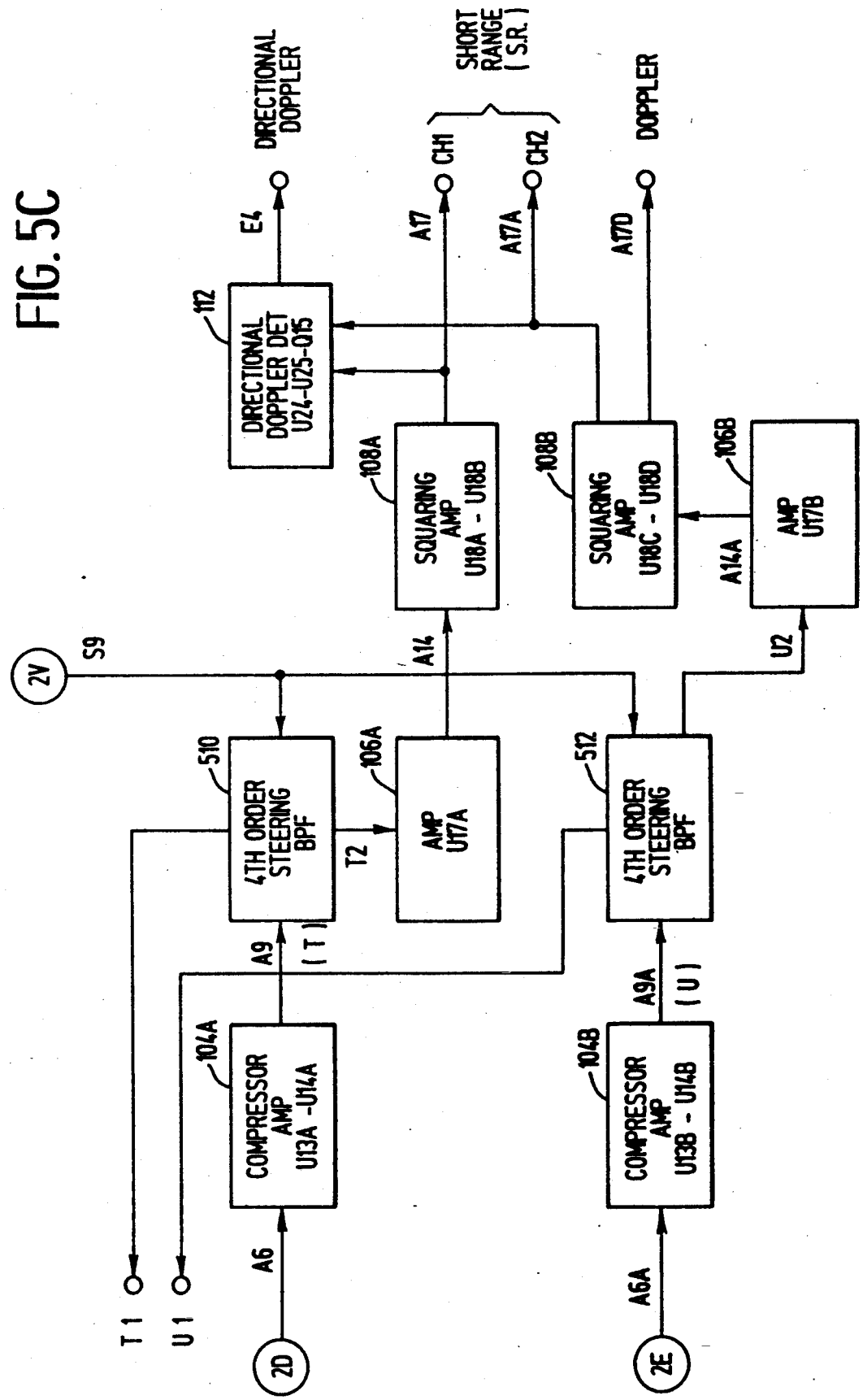

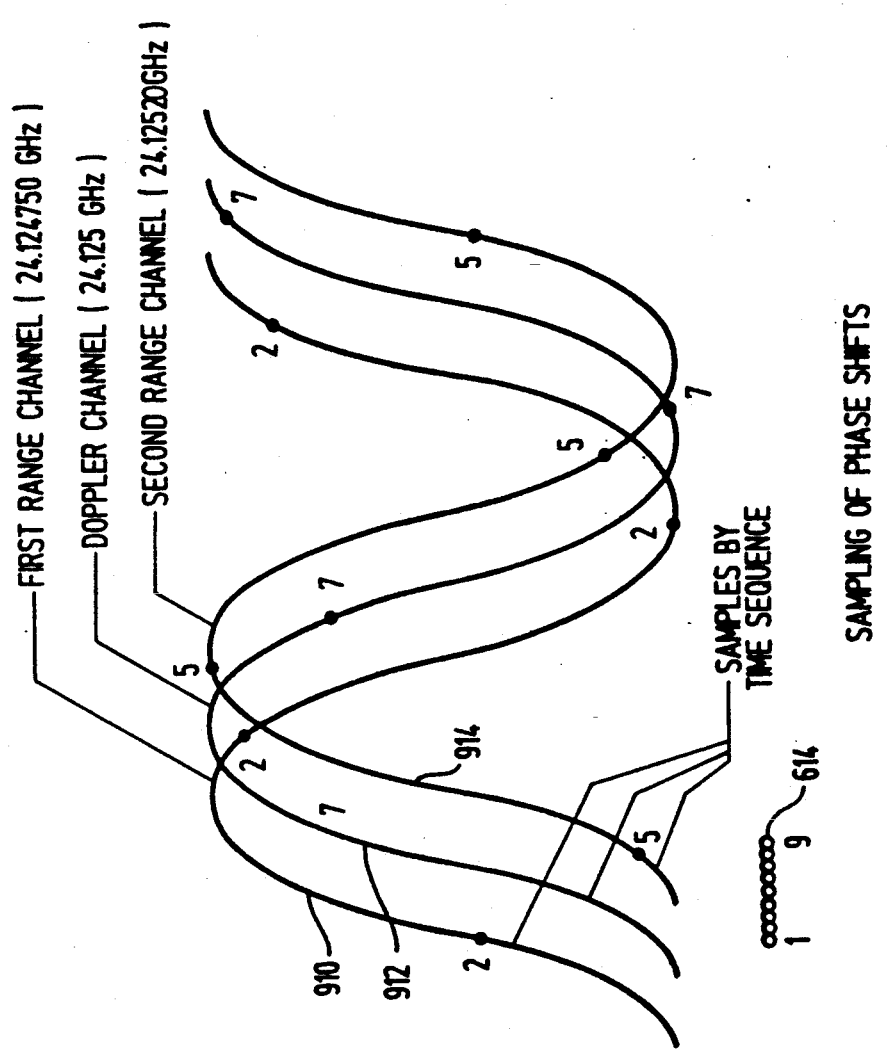
FIG. 9 SAMPLING OF PHASE SHIFTS

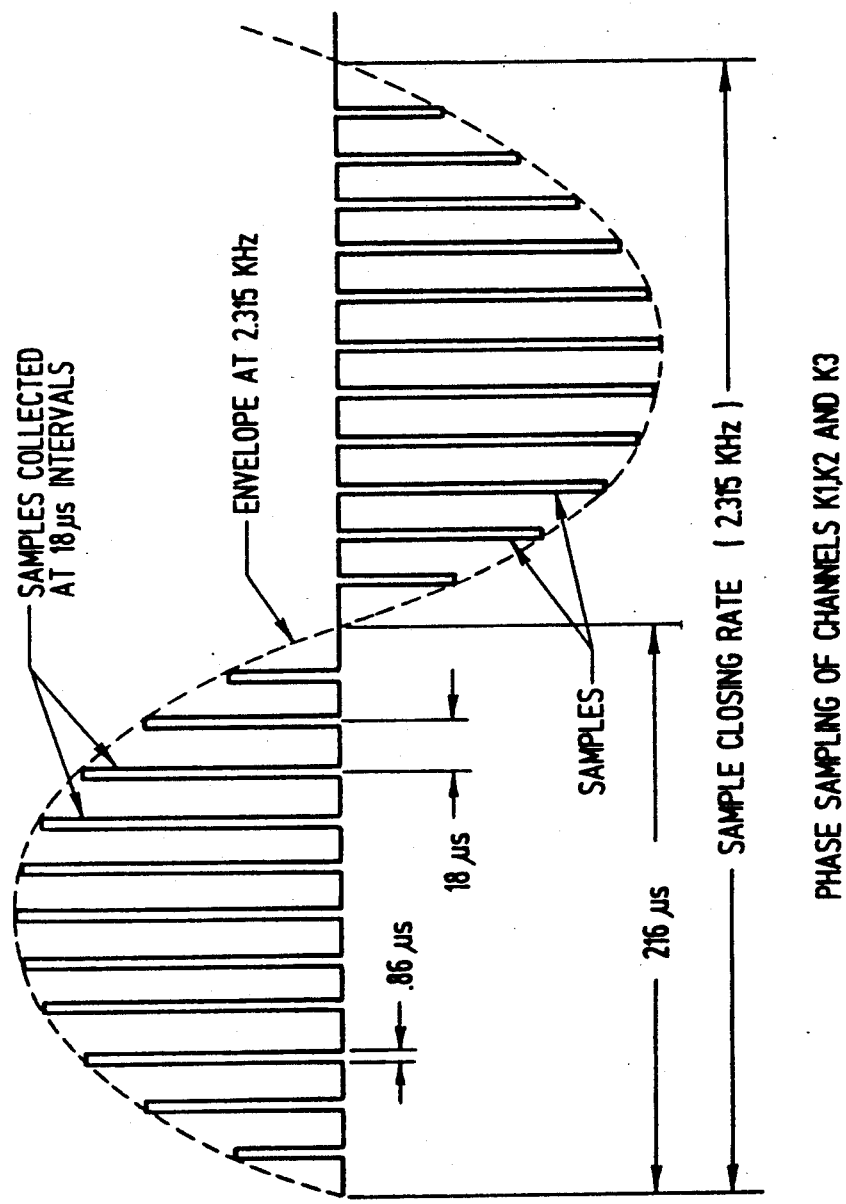

DOPPLER FREQUENCY
"NORMAL" CONDITIONING

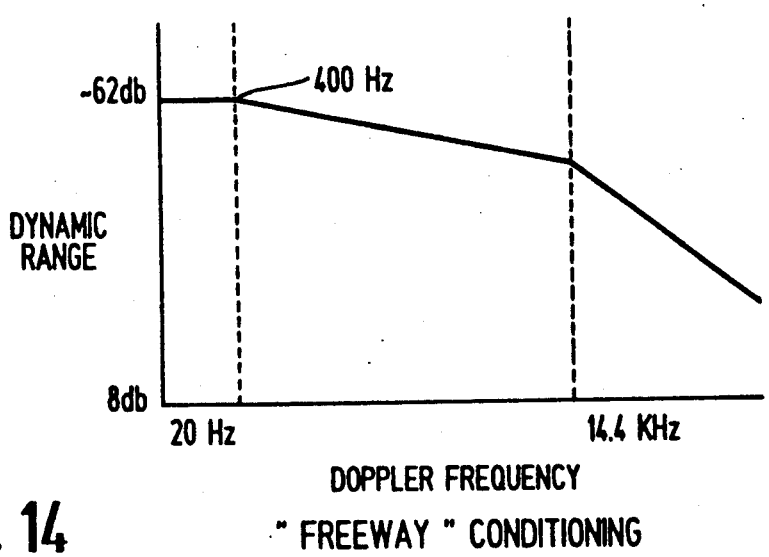
FIG. 14  "FREEWAY" CONDITIONING
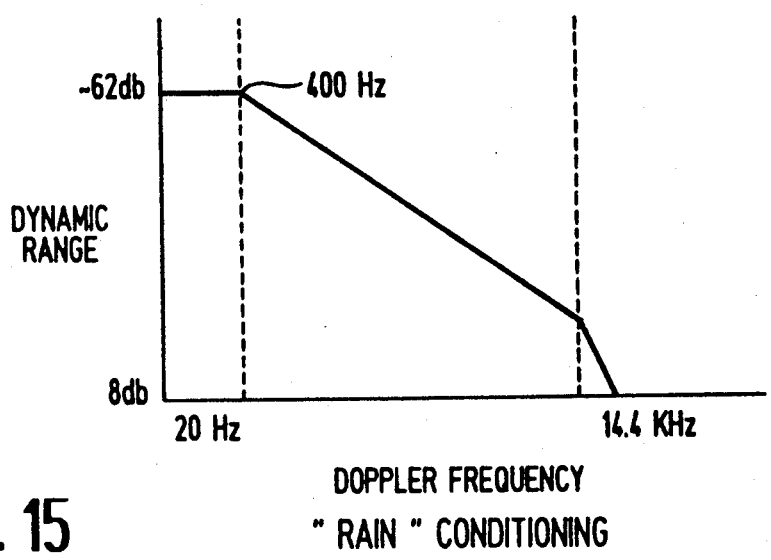
FIG. 15  "RAIN" CONDITIONING
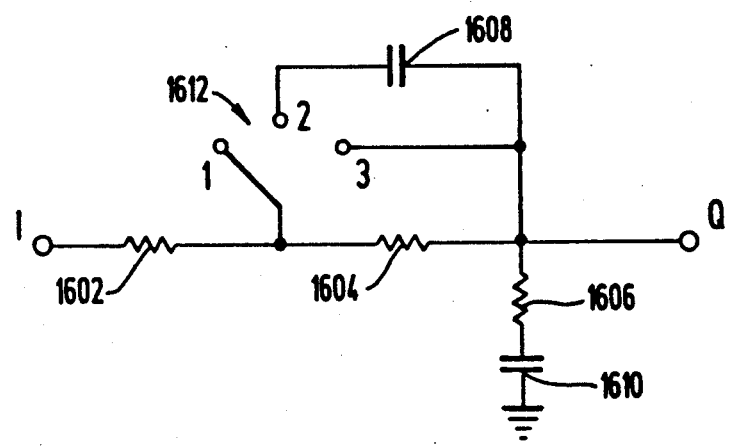
FIG. 16

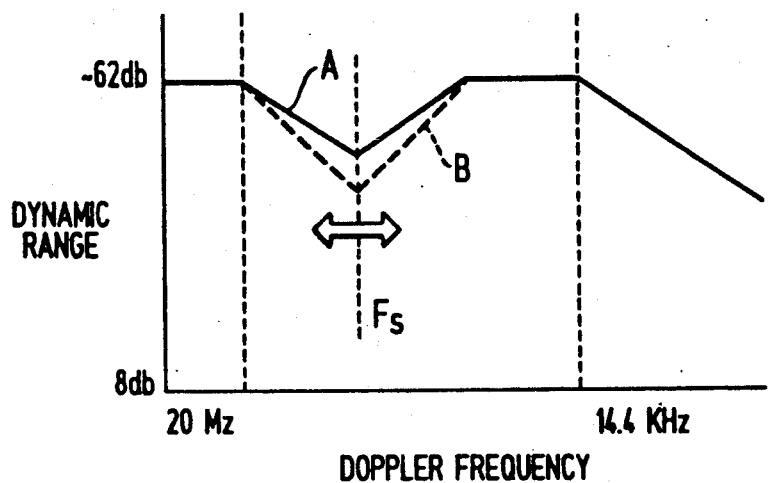
FIG. 17  "VARIABLE ENVIRONMENT" CONDITIONING
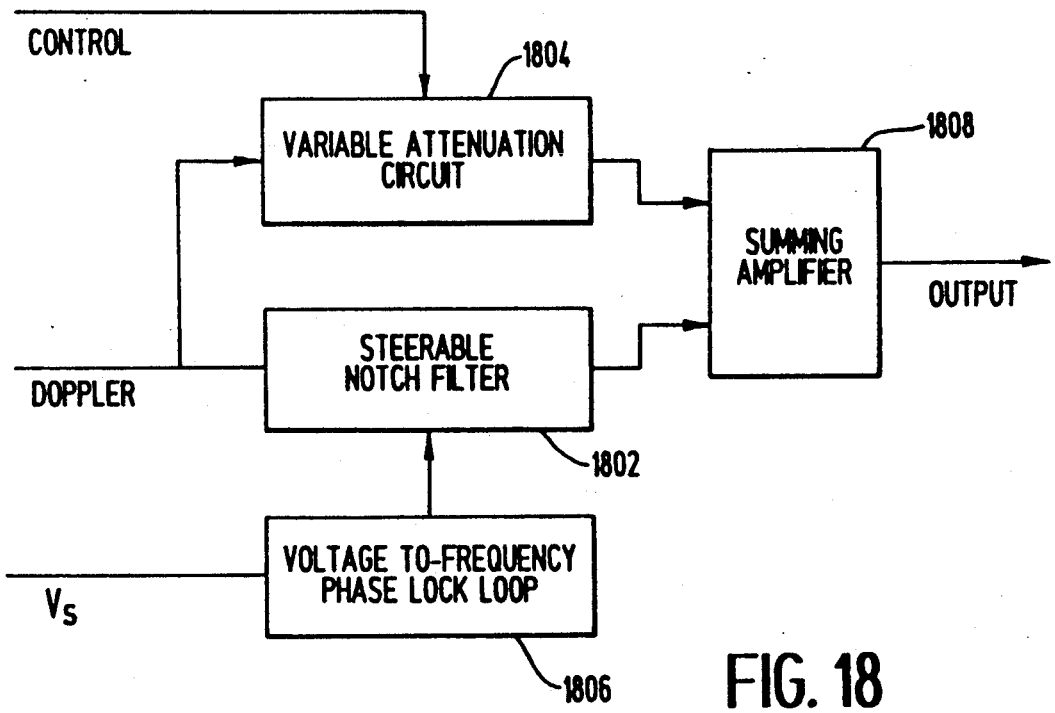
FIG. 18

DOPPLER FREQUENCY SPECTRUM DE-EMPHASIS FOR AUTOMOTIVE COLLISION AVOIDANCE RADAR SYSTEM

RELATED APPLICATION

This application is a continuation-in-part of application Ser. No. 07/695,951 of Jimmie Asbury and John W. Davis, filed May 6, 1991, entitled MULTI-FREQUENCY AUTOMOTIVE RADAR SYSTEM now abandoned.

BACKGROUND OF THE INVENTION

1. Field of the Invention

The invention is directed to radar devices and more particularly to (1) special circuits for use in modulated CW or pulse Doppler radar for enabling the radar to distinguish not only the phase differences (Doppler) between returning echo signals from one or more targets but also distinguish amplitude differences between the one or more targets and lock the attention of the radar onto a selected echo signal and continue to monitor that specific target echo so long as that target is of particular interest as determined by the radar system, and (2) special circuits for conditioning selected portions of the Doppler frequency spectrum to attenuate or de-emphasize portions of the echo signal corresponding to selected targets in the radar system environment, such as rain or stationary wayside objects, in order to give such echo signals less weight in determining roadway hazards.

2. Description of Related Art

U.S. Pat. No. 4,673,937 issued to John W. Davis on Jun. 16, 1987 and assigned to the Assignee of the present invention teaches a vehicle borne radar system presently believed to be at the leading edge of the vehicle borne radar art.

However, the above-referenced radar system is not able to distinguish one individual target echo signal from a plurality of incoming target echo signals of approximately the same amplitude and lock on to that particular target echo signal until that target echo signal is replaced by a new particular target echo signal.

There is a continuing need to improve the safety of highway vehicles operation for preventing impact with moving and stationary objects and to safely increase the density of vehicles traveling the world's roadways by monitoring the distance, speed and direction of travel between one vehicle following another thereon to conserve available road space by safely increasing the number of vehicles on a given roadway at any given time and yet maintain a higher than now possible degree of safety for the passengers carried by those vehicles.

The present invention relates to an improved vehicle borne radar system for monitoring possible dangerous conditions for a particular vehicle traveling on a vehicle roadway.

It is also known, as shown for example by U.S. Pat. No. 3,952,303 of Watanabe et al, to transmit and receive at three different frequencies on a time division basis, with two of the frequencies being used to determine range, closing speed and likelihood of collision and the third frequency being combined with one of the first two to determine direction. However, three frequency systems are capable of even further simplification in the circuitry thereof using different techniques of determining the desired information. Moreover, the transmit and receive frames containing the frequencies can be wasteful in that only small portions thereof are needed to receive and segregate the signals of different frequency, with the remaining potions being unused.

There is also a continuing need to condition the return echo signal from an automotive collision avoidance radar system in order to generate meaningful information from a very complex sequence of events. In such a system, the radar system transmits an RF signal outward through an antenna. If an object (target) is present, it reflects the RF signal. A very small part of the reflected signal is returned to the antenna. Target detection runs from very good to non-existent, even when a strongly reflecting target is present. Although radar target backscatter phenomenon is fairly well understood for distant targets and free space, the multitude of target sizes and shapes near a road surface can cause unusual problems for the processing circuitry of an automotive collision avoidance radar system. In particular, reflections from such environmental targets as rain, as well as non-threatening but strongly reflecting wayside targets such as overpasses, signs, etc., can obscure the information generated from a more threatening target in the environment (such as an on-coming automobile). Therefore, it would be desirable to condition the received Doppler frequency spectrum on a selected basis in order to de-emphasize non-threatening targets in comparison to targets having a higher probability of presenting a threat to a vehicle.

OBJECTS OF THE INVENTION

One of the objects of the present invention is to provide a novel collision avoidance system for a vehicle, which system will monitor a plurality of potential obstacles or targets and select the most prominent target for continuous monitoring. Included herein is such a system which will automatically lock onto the selected target until a more prominent target appears at which time the system will lock onto the more prominent target. Further included herein is such a system that will change monitoring from one target to another virtually instantaneously.

Another object of this invention is to improve the accuracy of vehicle borne radar systems by eliminating ambiguous echo signals from targets received by the radar.

Yet another object of the present invention is to provide a vehicle borne radar system that gives operator indications of whether or not a target has been selected for monitoring.

A further object of the present invention is to provide a two or more radar frequency system in which the received signals of different frequency are processed and combined in a manner which provides the desired information in accurate fashion using simplified circuitry.

A still further object of the present invention is to provide a multi-frequency radar system in which unused portions of the receive frame are identified and segregated so that they may be used in conjunction with one or more subsystems of the radar system.

Yet another object of the present invention is to provide a Doppler frequency spectrum de-emphasis function for an automotive collision avoidance radar system. In particular, it is an object of the present invention to condition the received Doppler frequency spectrum on a selected basis in order to de-emphasize non-threatening targets in comparison to targets having a higher probability of presenting a hazard to a vehicle.

SUMMARY OF THE INVENTION

The present invention is used in a system that advances vehicle operation safety by providing a radar vehicle expert warning system that allows the vehicle operator to continue his or her normal safe driving habits under safe conditions as defined by a first zone and warns that operator when his or her normal safe driving conditions go from the first safe zone to a second, hazard zone by providing a warning to the operator that the established safe driving conditions of the first zone are being exceeded by entry into the second zone and that impact with another object will occur unless the operator returns to a driving condition within the first, safe zone. The warning is in sufficient time for the operator to correct the dangerous condition in a normal and expected manner by slowing or stopping the vehicle before impact or turning the vehicle into a new path of travel whereby the object is bypassed. This is accomplished by the expert radar system continually monitoring the forward path of travel of a vehicle equipped with the expert system of this invention and providing a warning to the vehicle operator if that driver's normal zone is exceeded.

The invention is specifically directed to a vehicle borne expert radar system for alerting the vehicle operator of a dangerous vehicle condition in sufficient time for the operator of the vehicle to respond to that warning to avoid the dangerous condition, such as, a collision with another object. The system is designed to prevent needless disruption of the operator when the vehicle is not in a dangerous situation by appearing to be inactive. The system monitors a plurality of targets within a selected range and locks onto the most prominent target thereby eliminating all other targets until a more prominent target appears. The system gathers radar produced information directed to range the most prominent (dangerous) object relative to the vehicle to which the radar has locked onto and the closing rate of that selected object. The radar produced information is then summed with driving condition modifiers such as, by way of example only, the vehicle forward speed, steering angle, acceleration and braking in a radar signal processor. A headway control algorithm weighs the importance of these various inputs to be summed at a value which is relative to each other and to a preselected predetermined reference value according to their level of importance. The algorithm assumes that a minimum of three vehicle operation zones exist, namely, a safe zone, normal or alert zone and a hazardous or danger zone. These zones are determined in part by the habits of the particular vehicle operator, i.e., a conservative operator vehicle would have a smaller safe zone than a normally aggressive operator. When the algorithm results in a summed output signal level which falls in a given operator's safe zone the radar remains active but produces no driver warning. When the summed output signal level of the algorithm exceeds the safe zone and enters the hazardous zone the radar provides an output signal for warning the operator of the dangerous condition and will continue to warn the operator more dramatically as the level of danger increases, i.e., if the signal of the algorithm increases in a positive direction. For example, a conservative operator might have a maximum safe zone level of 390 units and an aggressive vehicle operator might have a maximum safe zone level of 410 units. If the factors considered by the algorithm produce 388 units for the first operator no radar warnings will be produced. Likewise, when the algorithm signal level output for the more aggressive operator reaches 409 units the safe zone will not be exceeded and, therefore, the radar will produce no operator warning (normal warning level 400 units). If the algorithm output level exceeds 390, 400 or 410 respectively the radar will produce an operator warning of an impending hazard or impact with an object. The first warning is timely to provide the operator time to either brake or turn to prevent impact with the detected object. If the first warning is not heeded by the operator, another warning will be produced by the radar again in time to use evasive action to avoid impact with the detected object if immediately acted upon by the operator. Warnings will be provided by the radar until either the object has been averted by an active maneuver by the operator or impact occurs. These operator warnings produced by the radar increase in intensity and emotion as the hazard increases not unlike the emotions of a person witnessing an increasingly dangerous condition and becoming more and more excited thereby, i.e., the first warning could be for example a soft spoken word or words and the level of a subsequent word or words could become increasingly more emotional by tone and/or volume. The final warning before impact could be in the form of a "scream" signal.

Further, in accordance with the invention the radar system may take advantage of a multi-frequency transmission system and the simplified circuitry which results. In a first embodiment of the invention using three frequencies, a continuously transmitted radar signal within a succession of transmit time intervals, or "frames", is transmitted, first at a frequency which is a fixed amount below a reference frequency, then at a frequency above the reference frequency by a fixed amount, and then at the reference frequency. Timing circuitry within the receiver portion of the radar system defines a succession of receive intervals, or "frames" that correspond to the transmit frames. Each receive frame is used to identify radar signals reflected back from a target at one of the three frequencies and to route such signals to a selected channel corresponding to the frequency. Received signals at one frequency are routed to a Doppler channel, while received signals at the other two frequencies are routed to a pair of range channels. The rate of phase shift within the Doppler channel is measured to provide an indication of the closing rate (positive or negative) of the target, while the phase shift difference between the pair of range channels is measured to provide an indication of the range and direction of the target. Signals representing the closing rate, range, direction, vehicle speed and other parameters are conditioned in a manner which concentrates on the strongest signal among a plurality of reflected signals, then applied to a data processor which may be used to implement the headway control algorithm to determine the hazard level and provide warnings as necessary.

Still further in accordance with the invention, the transmit and receive frames may be divided into a plurality of time interval windows. Within the transmit frame, each transmitted frequency is confined to an interval comprising a subset of all of the windows comprising the frame similarly, within the receive frame, each similarly, within the receive frame, each reflected frequency is received in an interval comprising a subset of the windows comprising the frame. The remaining windows, within the transmit and receive frames, are thereby freed, and may be used for transmission and receipt of signals in connection with subsystems of the radar system, such as those using wayside transponders to provide useful information.

Still further in accordance with the present invention, the audio-frequency Doppler spectrum of echo signals received from targets is selectively conditioned or de-emphasized such that the echo signals from rain and/or strongly reflecting wayside targets (e.g., overpasses, signs, etc.) are attenuated, and thus taken into lesser consideration by the processing circuitry of the automotive collision avoidance radar system in determining the presence of a potential roadway hazard. In one embodiment of the invention, the de-emphasis is accomplished by means of a low-pass filter, which in the preferred embodiment is selectively switchable between no de-emphasis, de-emphasis at a first level, and de-emphasis at a second level greater than the first level. In a second preferred embodiment, a steerable notch filter is provided that provides greater de-emphasis for target echo signals from targets having a speed near the speed of the user's vehicle. The degree of the de-emphasis in the second preferred embodiment is preferably selectable between at least two levels, in order to provide greater de-emphasis during particular conditions, such as during rain. The preferred embodiments of the present invention can be implemented using either analog or digital circuitry to accomplish the inventive function.

The above and other objects, features and advantages of the present invention will become more apparent from the following description of the preferred embodiment of the invention taken in conjunction with the accompanying drawing figures.

BRIEF DESCRIPTION OF THE DRAWING FIGURES

FIG. 1 is a showing of FIG. 2 of the U.S. Pat. No. 4,673,937.

FIG. 2 is a showing of FIG. 2A of the U.S. Pat. No. 4,673,937.

FIG. 3 is a showing of FIG. 2B of the U.S. Pat. No. 4,673,937.

FIGS. 4A and 4B are a showing of FIG. 2C of the U.S. Pat. No. 4,673,937.

FIGS. 5A, 5B and 5C show circuits embodying the present invention as incorporated in the circuit shown in U.S. Pat. No. 4,673,937.

Figure 7:
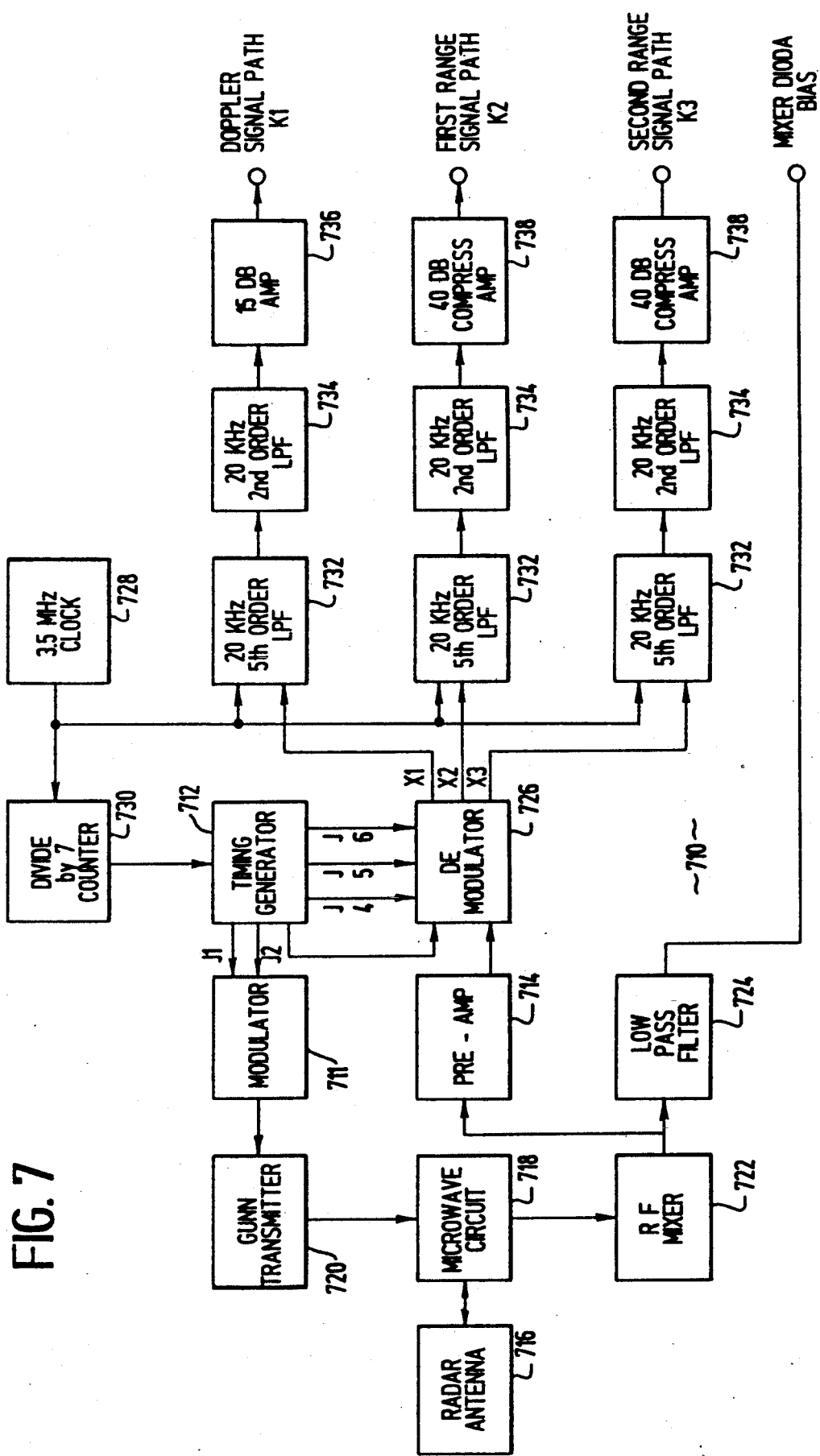
FIG. 7 is a block diagram of the front-end circuit of a radar system using the windowed three-frequency frames of FIG. 6.

FIG. 9 comprises waveforms illustrating the sampling of phase shifts within different channels as provided by the front-end circuit of FIG. 7.

FIG. 10 comprises a plot of samples within a sample closing rate envelope illustrating phase sampling within the channels as provided by the front-end circuit of FIG. 7.

Figure 11A:
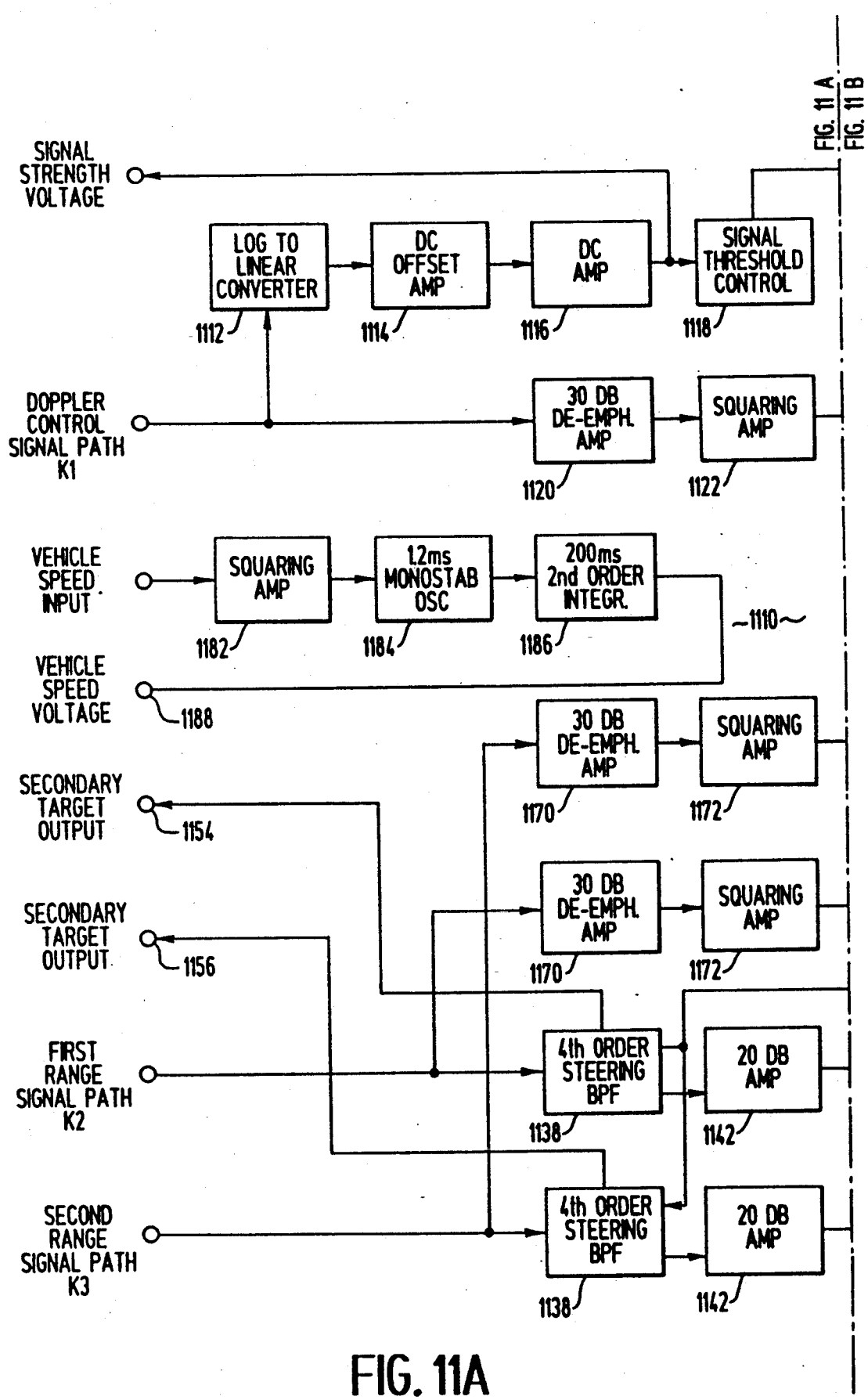
Figure 11B:
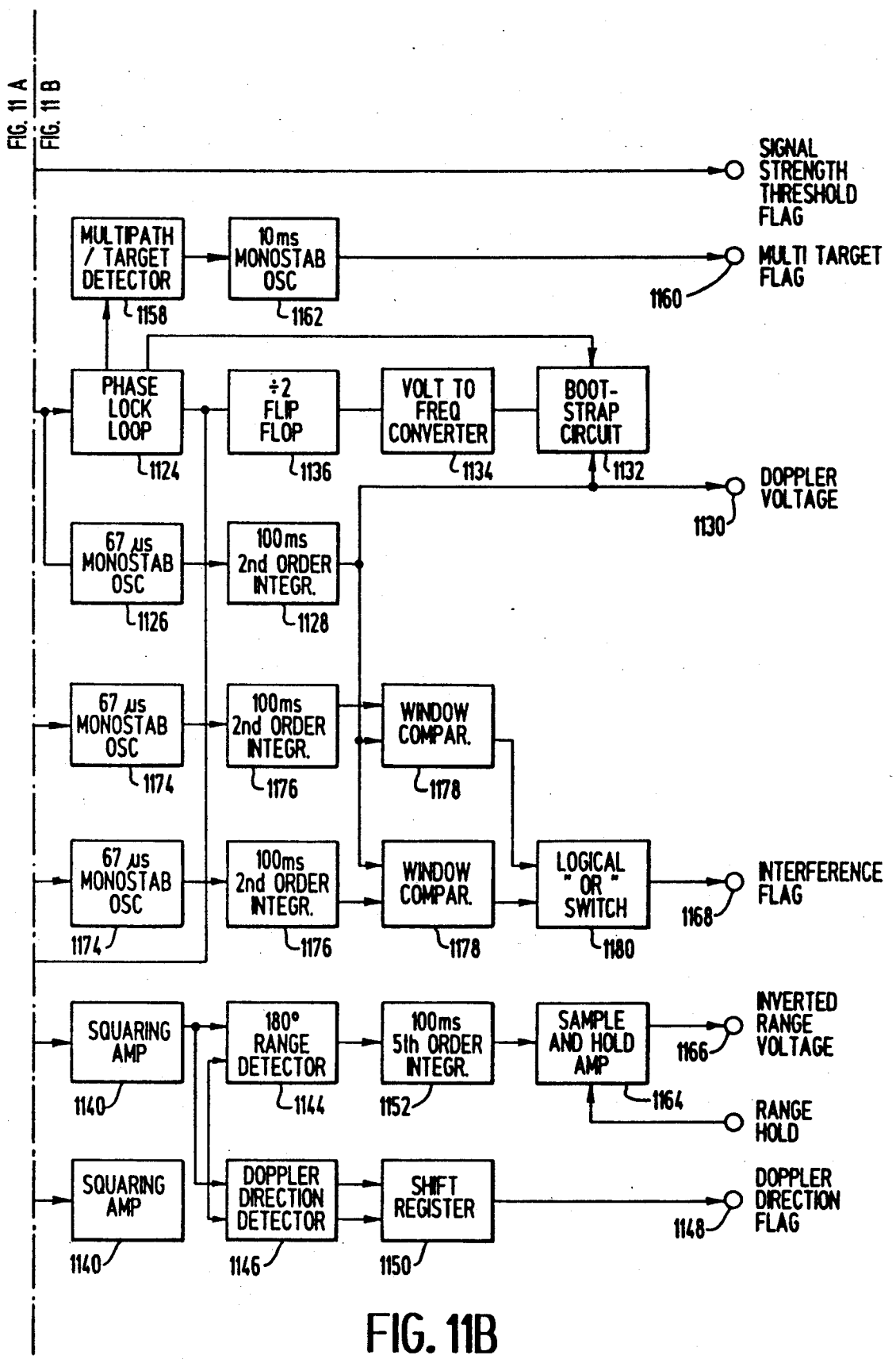

FIGS. 11A and 11B comprise a block diagram of a signal conditioning circuit for use with the front-end circuit of FIG. 7.

Figure 12:
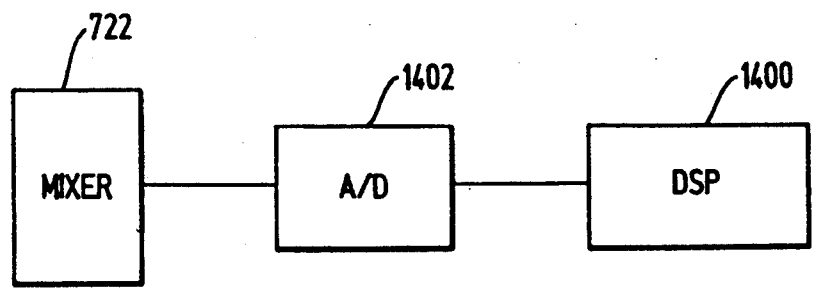

FIG. 12 is a block diagram of a digital signal processor embodiment of the present invention.

Figure 13:
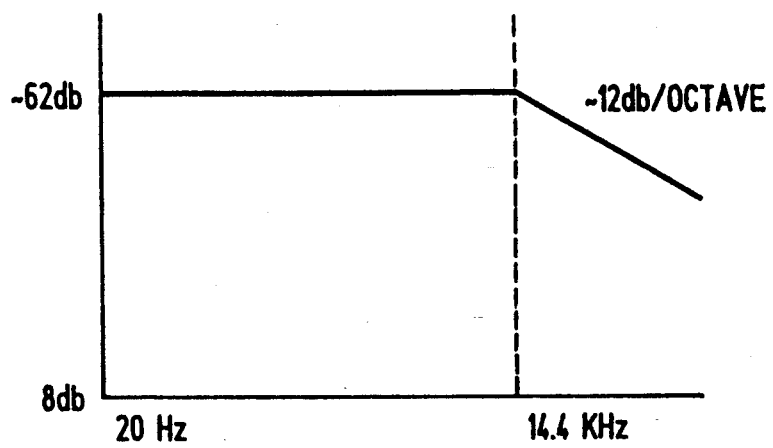

FIG. 13 is a diagram showing the amount of attenuation of target echo signals as a function of received Doppler frequency, showing "normal" conditioning, for one embodiment of the present invention.

FIG. 14 is a diagram showing the amount of attenuation of target echo signals as a function of received Doppler frequency, showing a first level of conditioning ("freeway" conditioning) for one embodiment of the present invention.

FIG. 15 is a diagram showing the amount of attenuation of target echo signals as a function of received Doppler frequency, showing a second level of conditioning ("rain" conditioning) for one embodiment of the present invention.

FIG. 16 is a schematic diagram of an analog version of one embodiment of the present invention.

FIG. 17 is a diagram showing the amount of attenuation of target echo signals as a function of received Doppler frequency, showing "variable environment" conditioning, for one embodiment of the present invention.

FIG. 18 is a block diagram of a circuit for implementing the "variable environment" conditioning function shown in FIG. 17, in accordance with the present invention.

Like reference numbers and designations in the drawings refer to like elements.

DETAILED DESCRIPTION OF THE PREFERRED EMBODIMENT

Referring now to drawing FIGS. 1-3 and 4A-4B, an explanation of these drawings can be found in the above-referenced U.S. Pat. No. 4,673,937 assigned to the same assignee as this invention.

Figure 1:
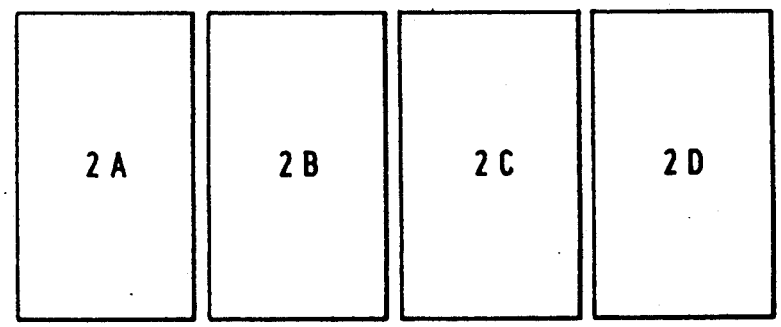
Figure 2:
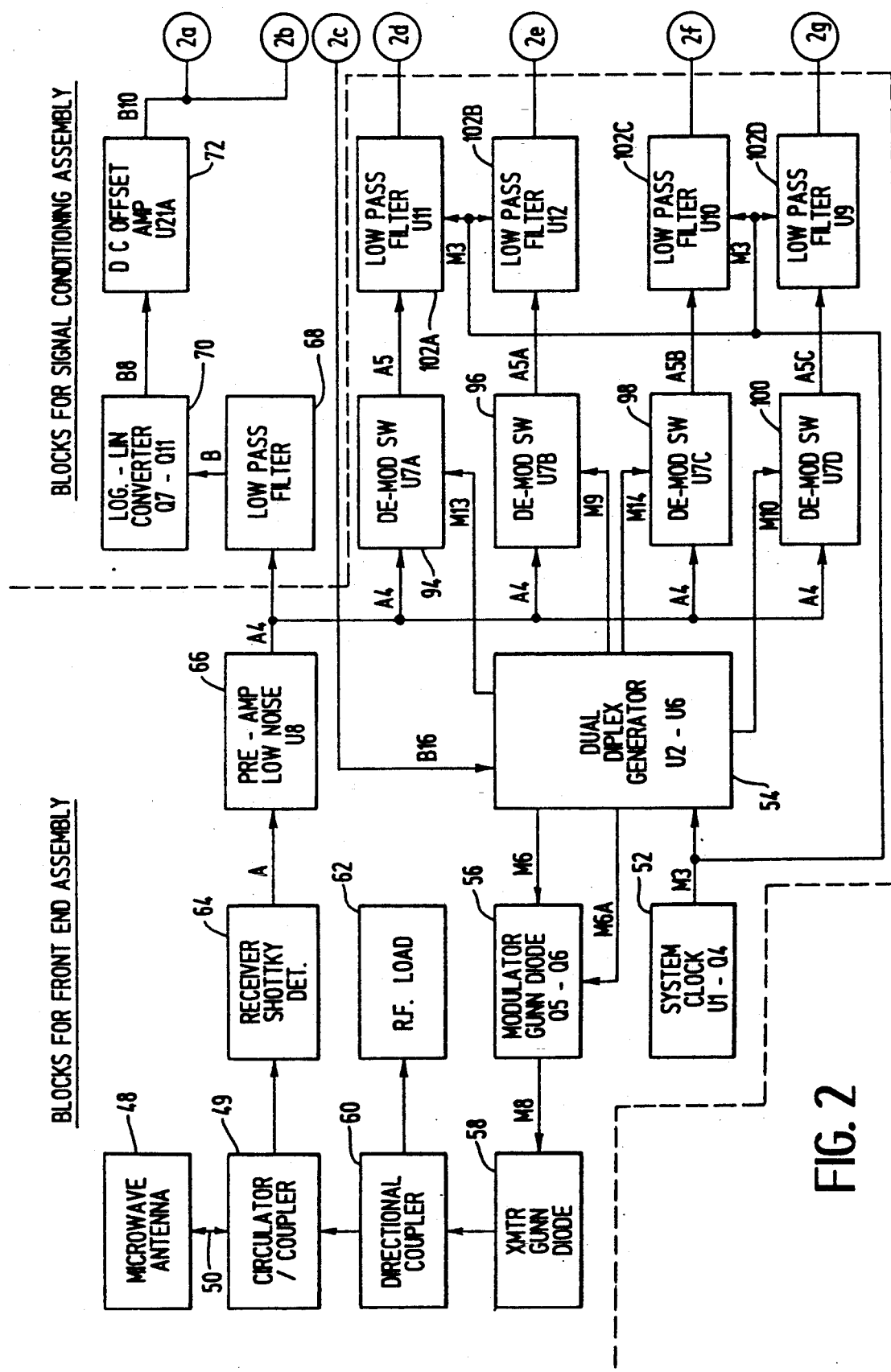

Referring now to drawing FIG. 2, the circuit of this figure is a showing of FIG. 2A of the Davis U.S. Pat. No. 4,673,937 which is modified by replacing the system clock 52 and the dual diplex generator 54 with a 3.5 MHz clock 516, a divide by seven counter 514 and a timing generator 518 connected to the circuit as shown in drawing FIGS. 5A-5D; eliminating the low pass filter 68 and the demod sw 100 and the low pass filter 102D. Also A6B is connected the input B to the log-lin converters 70 and to the Doppler control channel P.

Figure 3:
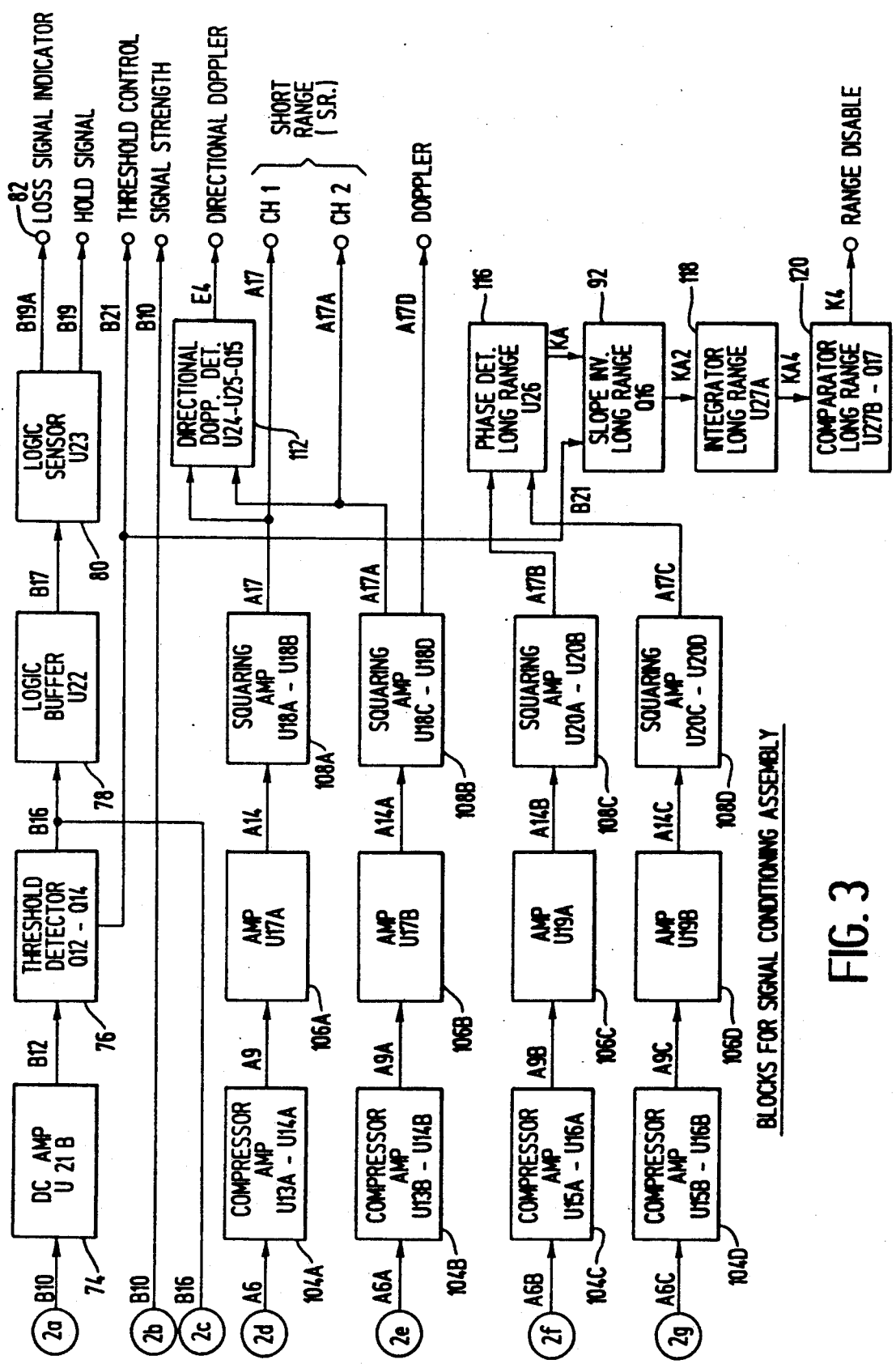

Referring now specifically to drawing FIG. 3 which is a showing of drawing FIG. 2B of the U.S. Pat. No. 4,673,937. In this drawing figure the modification includes inserting the steering bandpass filters 510 and 512, as shown in drawing FIG. 5 between compressor amps 104A and 104B;, then eliminating amps 106A, 106B, compressor amps 104C and 104D, amps 106C and 106D, squaring amps 108C and 108D, phase detector 116, slope inverter long range 92, integrator long range 118, comparator long range 120 and connecting the range disable point K4 to BB3 of drawings FIGS. 5A-5D.

Figure 4B:
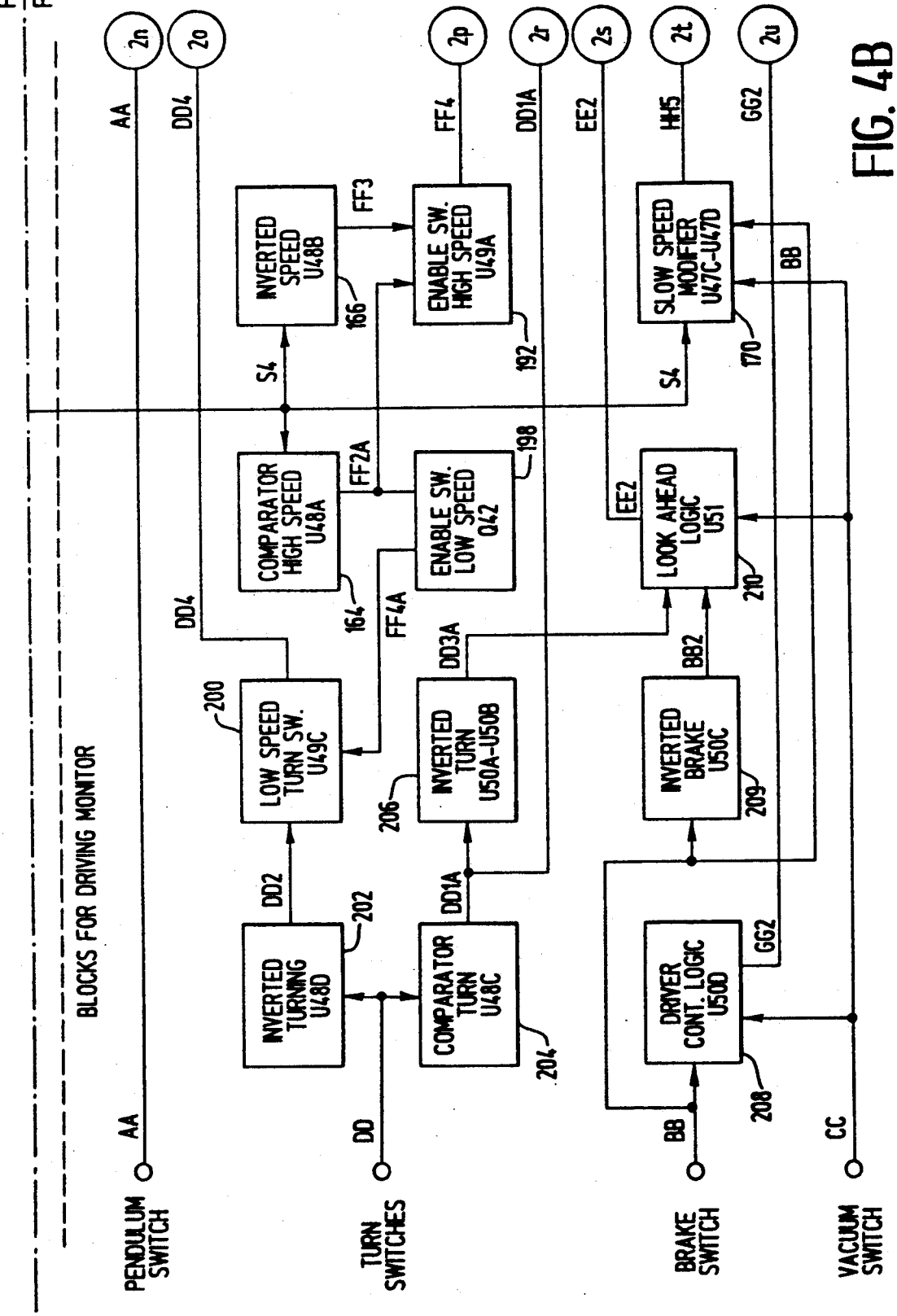

Referring now to drawing FIGS. 4A and 4B which is a showing of drawing FIG. 2C of the U.S. Pat. No. 4,673,937, this portion of the latter and remaining circuits remain unchanged.

Figure 5A:
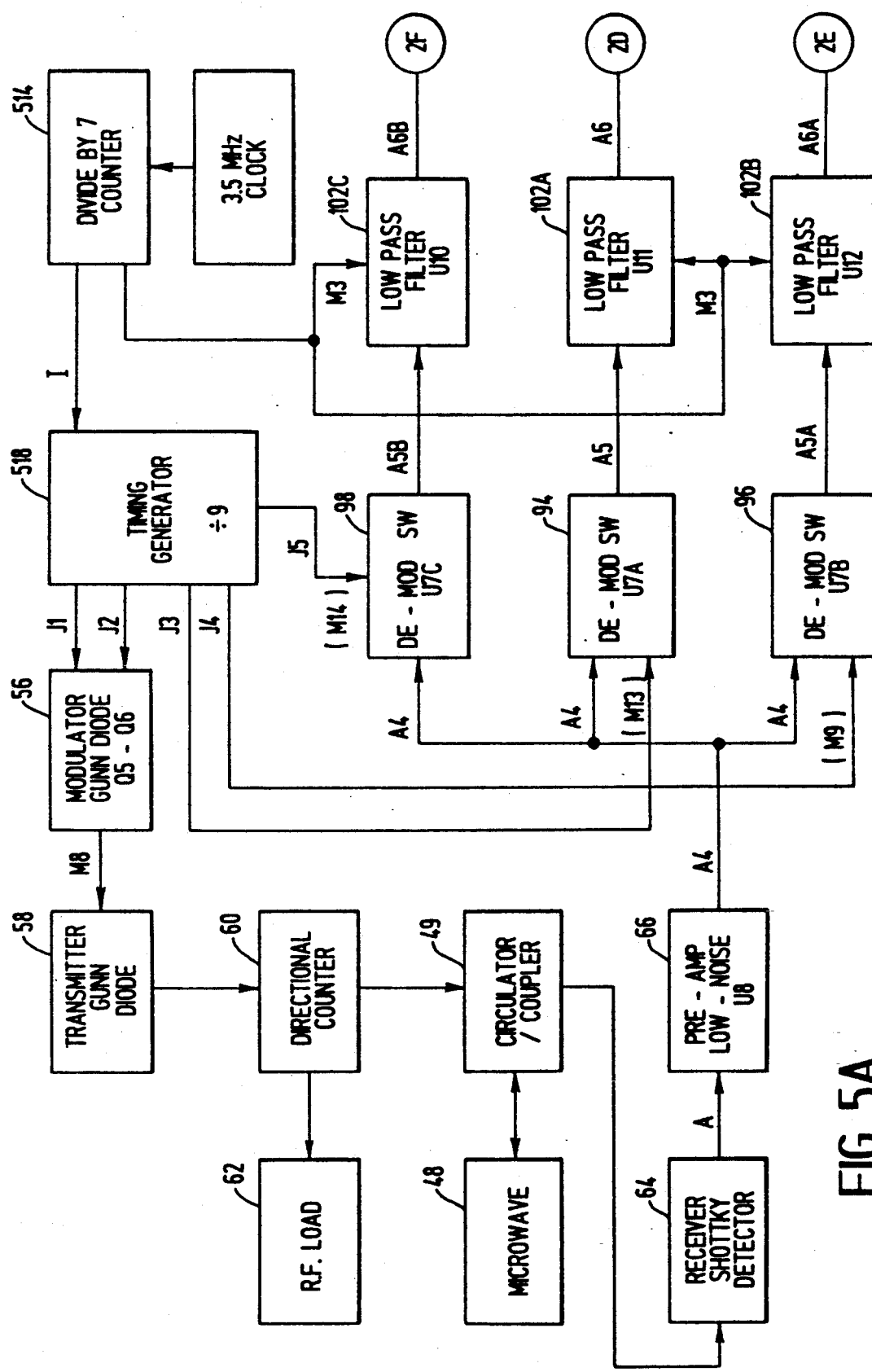
Figure 5B:
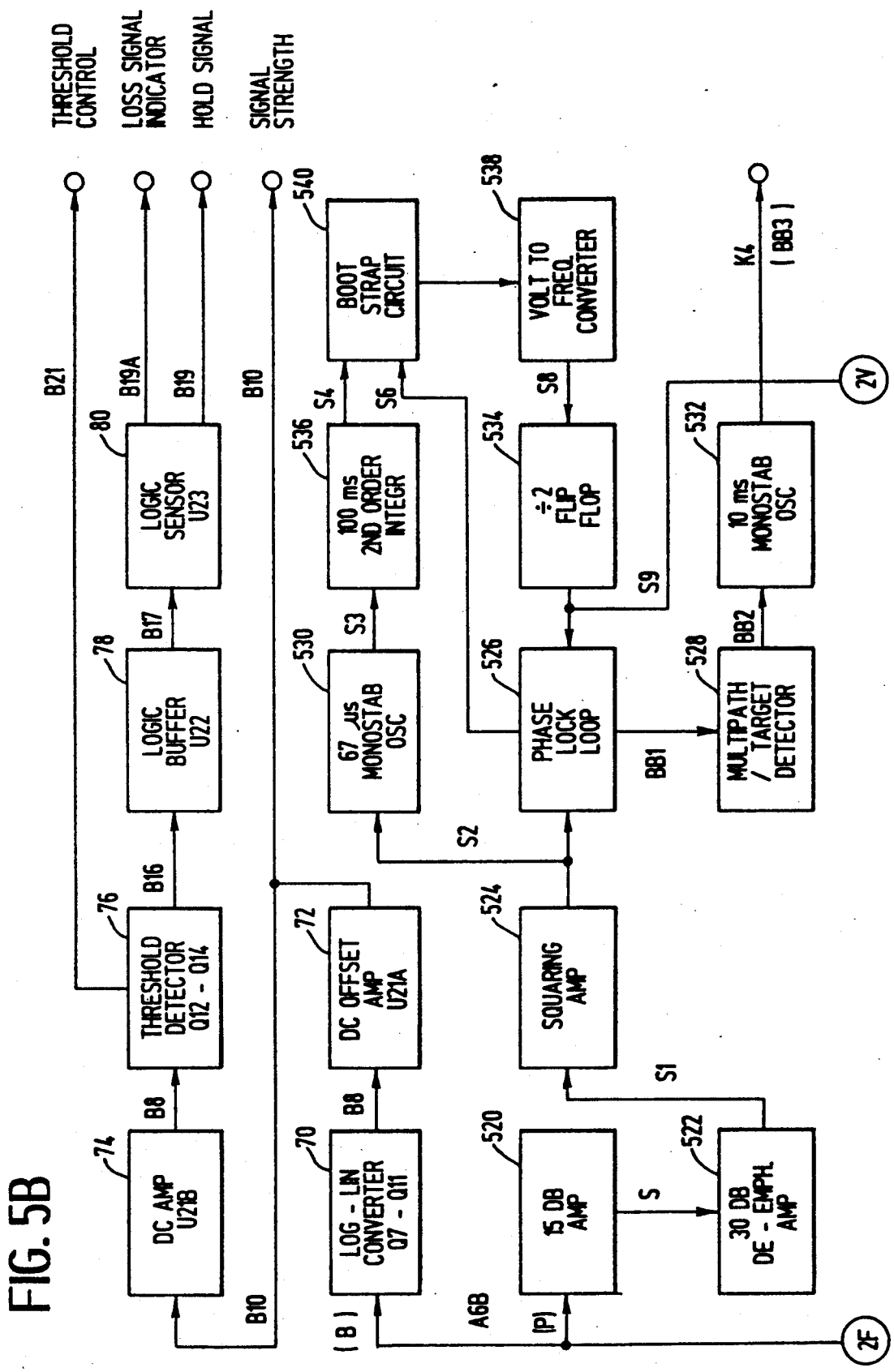

Referring now to drawing FIGS. 5A, B, C and 6, the new circuits shown include a divide by seven counter 514, a 3.5 MHz clock 516, a timing generator 518, fourth order steering band pass filters 510 and 512, a 15 db amplifier 520, a 30 db de-emphasis amplifier 522, a squaring amplifier 524, a phase lock amplifier 526, a multipath/target detector 528, a 67 microsecond monostable oscillator 530, a 10 milli-second monostable oscillator 532, a divide by 2 flip flop 534, a 100 milli-second 2nd order integrator 536, a voltage-to-frequency convertor 538 and a boot strap circuit 540. The listed new components of drawing FIGS. 5A, B and C are positioned and wired to each other and to the circuits shown in U.S. Pat. No. 4,673,937 as shown.

Figure 6:
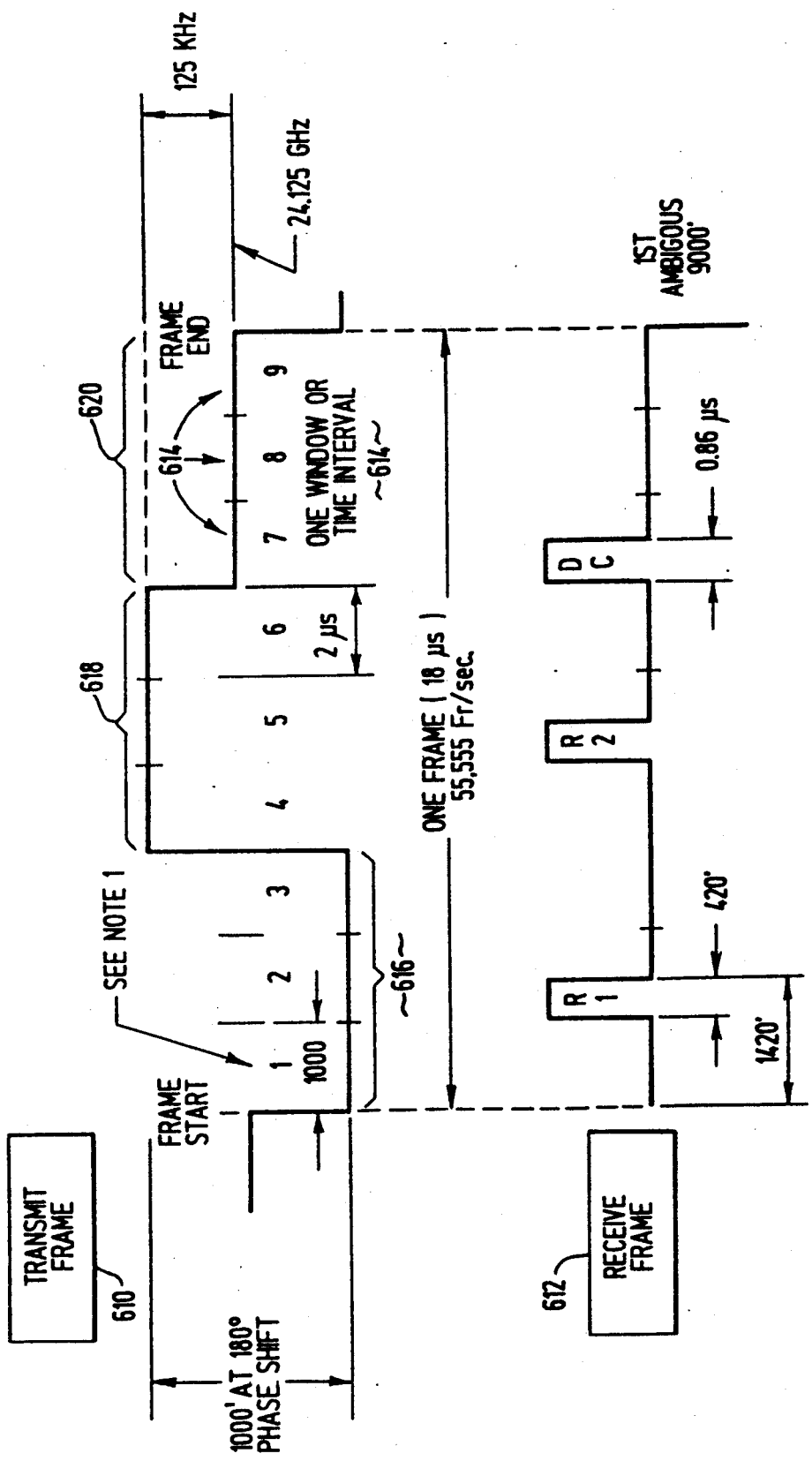
FIG. 6 shows diagrammatic representations of the transmit and receive frames used in conjunction with the circuits of FIGS. 5A, B and C, and also illustrating windowed three-frequency transmission and receipt of radar signals in accordance with the invention.

Referring now to the operation of the present invention as shown in drawing FIGS. 5 and 6, in addition to the phase, and rate of phase change (Doppler), the amplitude differences between several targets are evaluated by the Doppler control channel or circuits which includes 520-524 ("S-S2") and are used for target selection.

The amplitude of a principal or prominent target echo at the transmitter center frequency is determined in time sequence interval 7, see drawing FIG. 6. The Doppler rate of the principal target produces a proportional frequency in both range channels T and U and in the Doppler channel S. The range channels A6-A17 and A6A-A17A provide symmetrical and very accurate phase shift processing while disregarding amplitude differences. The Doppler control channel S, on the other hand, disregards phase shift but carefully preserves relative amplitude differences. It is these amplitude differences that are being used to distinguish targets, and by means of a steerable phase lock loop S2-S9 to tune the radar receiver to the most prominent target.

At the output of the Doppler control channel at S2 the frequency-to-voltage converter (FVC), consists of a one shot monostable oscillator 530 and a low pass filter 536, (well known in the art), which generate a Doppler voltage input to the bootstrap circuit 540 of the Doppler control channel.

The faster the closing rate, the higher the Doppler voltage. The Doppler voltage is 0-5 VDC, where 5 volts is equal to a Doppler rate of 200 mph. The Doppler voltage is summed with the output error voltage of the phase lock loop 526 (PLL) phase comparator "S6" and then applied to a voltage-to-frequency converter (VFC) "S7". The frequency converter output is 128 times the Doppler frequency "S9" and is applied to the phase lock loop 526 and the two range channels T and U to tune the center frequency of the steering band pass filters (SBPFs) 510 and 512 within a frequency range of 20 Hz to 14.4 KHz that is proportional to a Doppler rate between about 0.3 and 200 mph. The tuned band pass frequency of the SBPFs is the output frequency of the VFC 538 divided by 256 "S8" and is the frequency of the SBPF clock S9. This frequency is selected and maintained in both range channels "T2, U2" when the PLL has locked onto one of the multitude of frequencies (different targets) present in the Doppler channel "S". These frequencies result from: radar echoes from multiple targets, a signal echo returning by multiple paths, and echoes from reflecting objects that are too far away to be targets of interest. The PLL lock frequency is the frequency in the Doppler channel that has the largest amplitude "S1". This amplitude depends on the target and strength of the radar echo, which decreases as the distance to the target increases.

In this way, the range channel phase information that has been obtained from the most prominent target, is selected for further range processing by the SBPFs in the two ranging channels "T2, U2". Due to the amplitude discrimination occurring in the Doppler control channel "S1", which locks the phase lock loop to that target "S2-S9", all other target phase information is attenuated before entering the remaining range channel conditioning circuits. This Doppler control system enables the system to select or isolate a single target from many others.

Within a Doppler frequency span of between 20 Hz and 14.4 KHz (about 0.3 to 200 mph) "S2", the exact tuning of the SBPF depends on the steering voltage "S7" to bring the phase lock loop into lock. This voltage "S7", in turn, is derived from the sum of the Doppler voltage "S4", and the output error voltage of the phase lock detector "S6". The use of a frequency-to-voltage converter (FVC) "S2-S4" to increase the sum of the output bootstrapping of the phase lock comparator "S6" (error voltage) by the Doppler voltage, before it is applied to the VFC "S7", produces a high voltage slew rate and very fast frequency shift "S9" for rapid target selection lock.

When the phase lock loop error voltage "S6" becomes zero it also indicates target-lock condition "BB3". This also causes the steering voltage input to the VFC "S7" to stop changing. At this time, the frequency output is stabilized at 128 times "S9" the Doppler frequency "S2" of the most prominent target and is used as the clock frequency for the SBPFs. The SBPFs have then been tuned to pass the range phase information associated with the closing or opening rate of the selected target "T2, U2". The range channel differential phase information is finally applied to directional Doppler detector 112 "A17, A17A" to extract the target direction "E4" and range to the primary target at the output of phase detector short range 110. The range voltage is 0-5 VDC, with 5 VDC=1000 feet. The differential phase shift information which may be used to identify additional targets "T1, U1" is attenuated at the output of the SBPFs in the primary target channels "T2, U2". However, the primary target frequency is removed by the notch outputs in the SBPFs "T1, U1", the remaining differential phase information can be treated in a similar way as cited previously to provide range, Doppler rate and relative direction to a second or even higher number of targets. The output frequency of the amplitude detector (Doppler control) channel "S2" is used to detect the opening/closing rate of the target. It is first converted into a proportional steering voltage "S7" and is applied to the phase lock loop VFC converter 538. This voltage has two components. The primary one is the error voltage obtained from the phase comparator "S6", which produces a positive output voltage for inputs that have a higher frequency "S2". The second component of the steering voltage "S7" is obtained from the Doppler control channel frequency "S2". The frequency in this channel, which corresponds to the closing rate of the target, is converted to a proportional Doppler voltage "S4". This is added to the existing steering voltage "S6" so that lower closing rates will cause the PLL to slew to the frequency of the target as fast as the higher closing rates would.

As a target is acquired, the output error voltage from the phase lock loop 526 falls to zero "S6", leaving only the voltage "S4" to set the PLL phase-coherent frequency lock "S9". In the process, the output of the Doppler channel "S1" becomes a square wave "S2" with a repetition rate proportional to the closing rate. This square wave triggers a one shot multivibrator 530 to produce a variable duty-cycle width pulse train "S3" which is then integrated into a DC voltage "S4".

The amplitude of the DC voltage "S4" is dependent on how long the pulses are allowed to discharge the integrator 536 before another impulse charges it, i.e., the pulse recurrence frequency. On slow moving targets, the DC voltage is much lower than on fast moving ones. The DC voltage varies linearly from 0 to 5 volts "S4" and is proportional to the relative velocity of the target up to 200 mph.

The remainder of the circuits of U.S. Pat. No. 4,673,937 function as explained in the patent.

Further Example of the Invention

A further example of a radar system which utilizes the waveforms of FIG. 6 includes a front-end circuit 710 shown in FIG. 7. As described hereafter in connection with FIGS. 7-11, such circuits respond to received signals at the three different frequencies to determine desired information, including closing rate and range. In addition, the circuitry of such system divides each transmit frame and each receive frame into a plurality of different time interval windows, as shown in FIG. 6. Only certain ones of the plurality of windows are utilized in connection with the receipt of the transmitted radar signals at the three different frequencies. Consequently, the remaining windows comprising time space which would otherwise be wasted can be utilized to perform other functions, such as those performed by subsystems in conjunction with the radar system.

As shown in FIG. 6, a transmit frame 610 and a corresponding receive frame 612 are each 18 μs in length in the present example. Consequently, a succession of 55,555 such frames occurs during each second. The transmit frame 610 and the receive frame 612 are divided into nine windows 614 comprising time intervals of equal length. Consequently, each window 614 is 2 μs in duration. If the transmit frame 610 and the receive frame 612 are related to the distance traveled by the transmitted radar signals with reference to the time scale thereof, then each of the transmit and receive frames 610 and 612 corresponds to 9,000' extending from the transmitter, and each of the windows 614 corresponds to a distance of 1,000 feet.

In the illustrated embodiment, the transmit frame 610 comprises three different frequency intervals 616, 618 and 620. A continuously generated radar signal is transmitted at each of the three different frequencies during the frequency intervals 616, 618 and 620. This is accomplished by frequency switching on a time division basis, using a reference frequency of 24.125 GHz.

A first frequency which is a fixed amount of 0.000125 GHz less than the reference frequency, or 24.124875 GHz, is used during the first frequency interval 616. As shown in FIG. 6, the first frequency interval 616 encompasses the first three of nine of the windows 614 which extend along the transmit frame 610 and the receive frame 612. The second and third frequency intervals 618 and 620 encompass the fourth through the sixth and the seventh through the ninth ones of the windows 614, respectively.

Radar signals transmitted at the first frequency and reflected back or echoed by the target are detected within a receive interval R1 within the receive frame 612 as shown in FIG. 6. The interval R1 which commences at the beginning of the second window 614 is shorter than the second window, and has a length which translates into a ground distance of 420'. Because the first frequency is received during the interval R1 which occurs within the second one of the windows 614, the first and third ones of the windows 614 within the first frequency interval 616 are freed for use by other systems.

The second frequency is transmitted during the second frequency interval 618 which encompasses the fourth through the sixth ones of the windows 614. The second frequency is determined by adding the fixed amount of 0.000125 GHz to the reference frequency of 24.125 GHz. Accordingly, the second frequency is at 24.125125 GHz.

The second frequency is detected during a receive interval R2 which commences at the beginning of the fifth window 614. Like the interval R1, the interval R2 has a duration considerably shorter than that of the fifth window and corresponding to 420' of ground distance. The actual time length of the intervals R1 and R2 is 0.86 μs. By receiving the second frequency within the fifth window, the fourth and sixth windows 614 are freed for other uses.

The third frequency, which is the reference frequency of 24.125 GHz, is transmitted during the third frequency interval 620, comprising the seventh, eighth and ninth windows 614. The third or reference frequency is detected within a Doppler channel (DC) receive interval which commences at the beginning of the seventh window. As in the case of the intervals R1 and R2, the interval DC has a time duration of 0.86 μs, corresponding to a ground distance of 420'. Because the third frequency is received within the seventh window, the eighth and ninth windows 614 are freed for other uses.

The front-end circuit 710 shown in FIG. 7 is employed to transmit and receive radar signals at the three different frequencies and to define the transmit and receive frames 610 and 612 shown in FIG. 6. Among other things, the front-end circuit 710 functions to preamplify the target echo signals received back from the target, to phase shift sample the de-modulated target echo signals, to modulate the transmitter output frequency, to select the demodulator/receiver channel, and to amplitude discriminate the target echo signals.

A modulator 711 which provides signals defining the radar transmission is controlled by a timing generator 712. The timing generator 712 digitally controls the modulator 711 through reference frequency modulation signals J1 and J2, by frequency shift keying the modulator 711 and by synchronous and sequential switching of the received echo signals J3, J4, J5 and J6 into each of three different receiver/demodulation channels K1, K2 and K3. The timing generator 712 functions to define the transmit and receive frames 610 and 612 of FIG. 6, as described hereafter.

The front-end circuit 710 also includes a pre-amplifier 714 and low pass filters for the signal paths K1, K2 and K3 which integrate the short sampling output pulses in each channel (see FIG. 10) into continuous sine waves for all targets within the beam width of a radar antenna 716 (see FIG. 9). The radar antenna 716 is associated with microwave circuits 718 which are coupled to receive transmission signals from a radar transmitter in the form of a Gunn diode transmitter 720, coupled to a modulator 711. The signals received by the radar antenna 716 are reflected back from a target are coupled by the microwave circuits 718 through an RF mixer 722 to the pre-amplifier 714 and to a low pass filter 724 to provide a mixer diode bias. The pre-amplifier 714 is coupled to the three receiver demodulation signal paths (more broadly, signal paths) K1, K2 and K3 through a demodulator 726 which is controlled by the timing signals J3–J6 from the timing generator 712. The timing generator 712 is supplied by a 3.5 MHz clock 728 through a divide by seven counter 730. The 3.5 MHz clock 728 also feeds a 20 KHz fifth order low pass filter (LPF) 732 within each of the receiver demodulation signal paths K1–K3.

The Gunn transmitter 720, which is of the continuous wave (CW) diode type, has its frequency changed in a specific sequence of three frequency shift keying intervals within each transmit frame 610 shown in FIG. 6. As shown in FIG. 6, the sequence is comprised of the first frequency of 24.124875 GHz during the first frequency interval 616, followed by the second frequency of 24.125125 GHz during the second frequency interval 618, and then the reference frequency of 24.125 GHz during the third frequency interval 620. The echo signals received from the target by the radar antenna 716 and provided by the microwave circuits 718 to the RF mixer 722 are combined in the same sequence J1–J6 as the transmitter frequencies are shifted, to distinguish the phase change at each of the three frequencies transmitted and received within a frame. The difference in phase shift between the first range signal path K2 and the second range signal path K3 is an indication of the distance or range to the target. The rate of phase shift (frequency) in the signal path K1 which comprises a Doppler control signal path is an indication of the opening or closing rate of the target. The Doppler frequency is in the audio frequency spectrum of approximately 20 Hz–14.4 KHz.

In addition to the 20 KHz 5th order low pass filter 732, the Doppler signal path K1 also includes a 20 KHz 2 nd order low pass filter 734, as do the first and second range signal paths K2 and K3. The output of the 20 KHz 2 nd order low pass filter 734 within the Doppler signal path K1 is coupled through a 15 db amplifier 736. The 20 KHz 2 nd order low pass filters 734 within the first and second range signal paths K2 and K3 are coupled through a 40 db compression amplifier 738.

Figure 8:
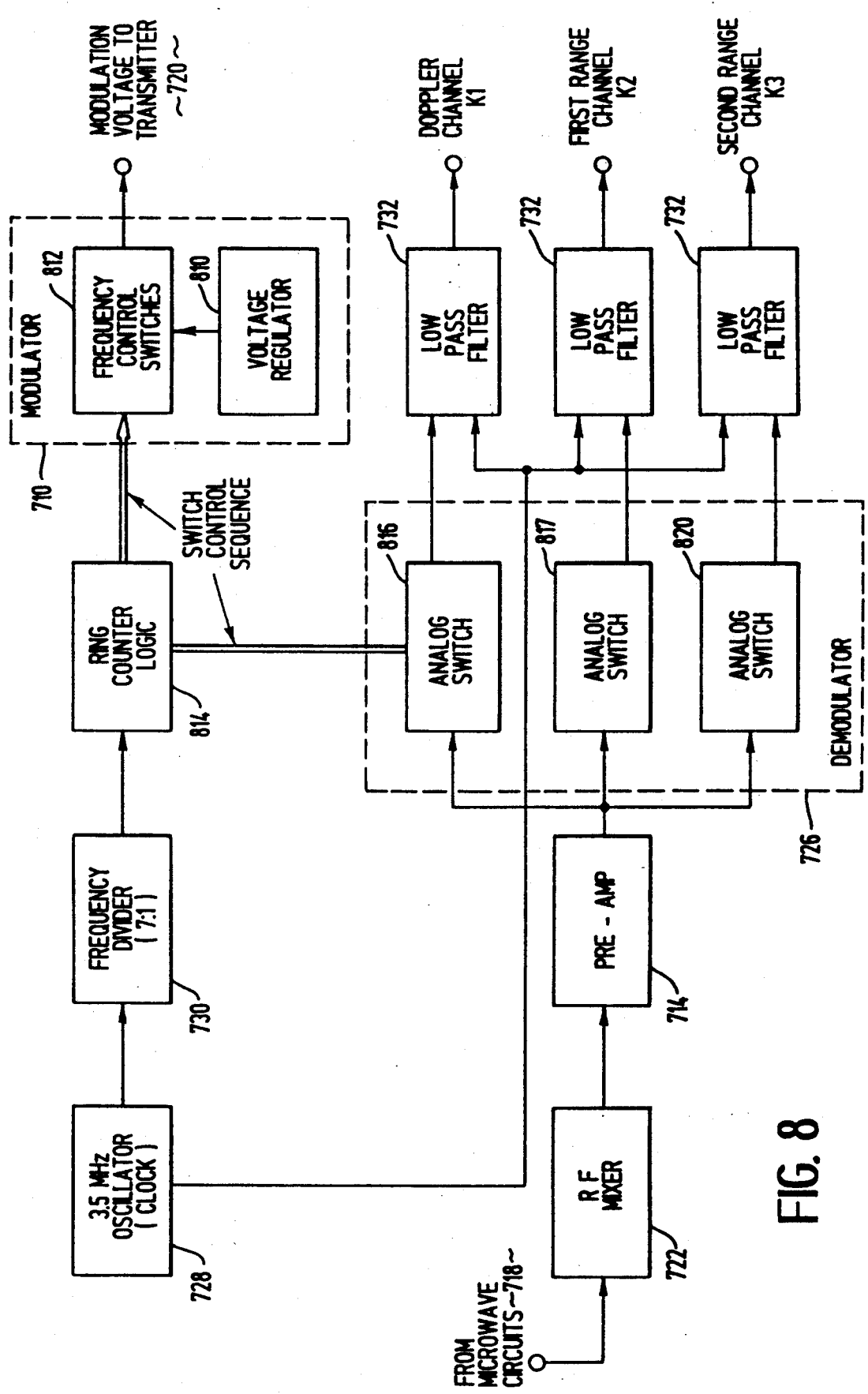
FIG. 8 is somewhat more detailed block diagram of a portion of the front-end circuit of FIG. 7.

FIG. 8 is a somewhat more detailed showing of a portion of the front-end circuit 710 of FIG. 7. As described in connection with FIG. 7, the Gunn transmitter 720 provides the three frequencies of the transmit frame 610 in response to the modulator 711. The modulator 711 is shown in FIG. 8 as comprising a voltage regulator 810 and frequency control switches 812. The timing generator 712 of FIG. 7 comprises a ring counter logic circuit 814 which is coupled to provide timing control signals to the switches 812 as well as to the demodulator 726. The ring counter logic 814 is also coupled to the divide by seven counter 730 which, as noted in connection with FIG. 7, is coupled to the 3.5 MHz clock 728. As shown in FIG. 8, the 3.5 MHz clock 728 comprises a 3.5 MHz oscillator, and the divide by seven counter 730 comprises a 7:1 frequency divider.

The voltage regulator 810 shown in FIG. 8, and which has a stable +5.0 volt output, is coupled to the diode of the Gunn transmitter 720. The Gunn diode of the Gunn transmitter 720 functions as the transmitter oscillator, and its frequency is dependent on the voltage applied thereto. To control the frequency provided by the Gunn transmitter 720, the current into the Gunn diode, which is typically 145 ma, is sequentially increased under control of the timing signals J1 and J2 shown in FIG. 7. As the current is increased, the resulting voltage drop changes the frequency of the Gunn transmitter 720 accordingly.

A portion of the circuit of FIG. 8 functions as a phase shift sampling circuit, to route samples of the received target echo signals to the Doppler signal path K1, the first range signal path K2 and the second range signal path K3. This routing occurs during a portion of the time when the Gunn transmitter 720 is transmitting the frequency intended for one of the signal paths K1, K2 and K3. The ring counter logic 814 controls the voltage applied to the diode of the Gunn transmitter 720, and thereby the frequency produced by the transmitter 720. The frequency divider 730 divides the 3.5 MHz frequency of the oscillator 728 by seven to provide a frequency of 500 KHz which is applied to the ring counter 814. This produces a positive output pulse sequentially at each of nine output pins of the ring counter 814. Three of the outputs are ORed together to provide the signal J2, and three other outputs are ORed together to provide the signal J1. Additional logic circuits within the ring logic counter logic 814 provide the remaining timing gate signals J3–J6 as described in connection with FIG. 7. The timing gate signals J3–J6 control analog switches 816, 818 and 820 within the demodulator 726, thereby routing the target echo signals to the appropriate signal path K1, K2 or K3.

Because the ring counter logic 814 is controlling the frequency shifts of the Gunn transmitter 720, it simultaneously generates the three sequential enable gates J4, J5 and J6, which are 0.86 μs in duration and which correspond to the receive intervals R1, R2 and DC, respectively, in the receiver frame 612 shown in FIG. 6. Generation of the enable gates J4, J5 and J6 is delayed following the switching of the frequency of the Gunn transmitter 720 at the beginning of the respective windows 614 therefor long enough so that any frequency transients which result from the frequency change of the Gunn transmitter 720 do not interfere with accurate reception of the relatively weak target reflection or echo signals. When one of the enable gates J4, J5 and J6 is present, the output of the pre-amplifier 714 is coupled by a corresponding one of the analog switches, 816, 818 and 820 to the associated one of the low pass filters 732.

FIG. 9 illustrates the manner in which the phase shifts may be sampled using the three different frequencies of the transmitted and received signals. A first curve 910 corresponds to the first frequency (24.124875 GHz) which is used in conjunction with the first range signal path K2. A second curve 912 corresponds to the reference frequency (24.125 GHz) of the Doppler signal path K1. A third curve 914 corresponds to the second frequency (24.125125 GHz) of the second range signal path K3. The curves 910, 912 and 914 are referenced to time, with the nine windows 614 of one of the 18 μs frames being illustrated along a portion of the horizontal time axis.

When the transmitter frequency is changed, the phase shift of the energy reflected from the target is sampled. Reflected energy during the receive interval R1 at the beginning of the second window is routed to the first range signal path K2. During the receive interval R2 at the beginning of the fifth window, and with the transmitter sending at 24.125125 GHz, received energy is routed to the second range signal path K3. During the receive interval DC at the beginning of the seventh window, with the transmitter at the reference frequency 24.125 GHz, reflected energy is routed to the Doppler signal path K1. The difference in phase shift between the first and second range signal paths K2 and K3 is linearly proportional to the range of the target from the transmitter.

As previously noted in connection with FIG. 6, the transmit and receive frames 610 and 612 are 18 μs in length. Such frame length therefore has a first target ambiguous range of 9,000' or nearly two miles, and at 9,000' multiples thereafter as the frame is repeated. Use of ranges beyond 9,000' are usually only possible under ideal conditions, such as with ideal road geometry and a very large object oriented centrally in the antenna beam width (such as in the case of a high rise building) and with no other targets in the first 420' in front of the vehicle radar system. The probability of this happening, with only a half milliwatt of power being transmitted, is extremely low.

FIG. 10 further helps to illustrate the phase sampling of the three different signal paths K1, K2 and K3. FIG. 10 is a plot with respect to time which illustrates samples collected at 18 μs intervals. An exemplary envelope at 2.315 KHz is shown, corresponding to a closing rate of 2.315 KHz.

As previously noted in connection with FIG. 7, the first and second range signal paths K2 and K3 include the 40 db compressor amplifiers 738. The amplifiers 738 reduce the dynamic amplitude range between weak and strong target echoes which have a dynamic voltage range of 1 to 10,000 (80 db). The compressor amplifiers 738 reduce the dynamic range to 1-100 (40 db) so as to maintain signal integrity without distortion. Without the compressor amplifiers 738, the system would miss weaker targets or saturate on strong targets. The compressor amplifiers 738 comprise operational amplifiers with feedback loops. A compressor amplifier is not used in the Doppler signal path K1, inasmuch as amplitude differences between targets should not be reduced in that signal path. Such amplitude differences are used to distinguish one target from another.

FIGS. 11A and 11B show a signal conditioner circuit 1110 which is used with the front-end circuit 710 of FIG. 7. The signal conditioner circuit 1110 functions to take the raw signals from the Doppler signal path K1 and the first and second range signal paths K2 and K3 of the front-end circuit 710, along with a signal representing the speed of the vehicle, and process such signals into voltages proportional to range, closing rate, signal strength and vehicle speed. These voltages, along with several binary flags also generated by the signal conditioner circuit 1110, are then output to a data processor for further processing and evaluation.

The signal conditioner circuit 1110 includes circuitry which measures the relative strength of the reflected or echo radar signals and produces a DC output voltage logarithmically proportional to the strength of such signal. Such circuitry includes a cascade of logarithmic amplifiers forming a log to linear converter 1112, a DC offset amplifier 1114 and a DC amplifier 1116. The logarithmic amplifiers (four) comprising the log to linear converter 1112 provide currents which vary 20 db over a signal amplitude range of 10. The voltage at the output of the converter 1112 therefore varies by a factor of 80 db when the signal varies by a factor of 10,000. This voltage is filtered by the DC offset amplifier 1114 and amplified by the DC amplifier 1116 before being applied to a signal threshold control circuit 1118. The DC voltage increases 1 volt/20 db of signal increase (4 VDC=80 db). The output of the DC amp 1116 also provides a signal strength voltage which can be used in the data processor described hereafter. The output of the signal threshold control circuit 1118 goes high (logically) whenever the received signal is too weak to process (approximately 8 db above the system noise floor).

The output of the Doppler signal path K1 in the front-end circuit 710 of FIG. 7 is applied to a Doppler control signal path portion of the signal conditioner circuit 1110, which processes the raw Doppler signal path signal and outputs it as a DC voltage 1130 proportional to the speed difference between the vehicle and the target. The amplitude of the received signal at the reference frequency of the transmitter is determined within the seventh window of each receive frame, as previously described. The Doppler rate of the principal target produces a proportional frequency in both range signal paths K2 and K3 and in the Doppler signal path K1. The range signal paths K2 and K3 provide symmetrical and highly accurate phase shift processing while disregarding amplitude differences. The Doppler signal path K1, on the other hand, disregards phase shift but carefully preserves relative amplitude differences. Such amplitude differences are used to distinguish targets and to tune the radar receiver to a particular target using a steerable phase lock loop.

The signal conditioner circuit 1110 includes a continuation of the Doppler signal path K1. The Doppler signal path K1 includes a 30 db De-emphasis Amplifier 1120 which is coupled through a squaring amplifier 1122 to a phase lock loop 1124 and to a 67 μs monostable oscillator 1126. The oscillator 1126 acts as a frequency to voltage converter preceding a 100 ms 2nd order integrator 1128 which acts as a low pass filter to produce a Doppler voltage at an output terminal 1130 and to a bootstrap circuit 1132. The bootstrap circuit 1132 forms a part of a phase lock loop circuit together with the phase lock loop 1124, a voltage to frequency converter 1134 and a divide-by-2 flip flop 1136.

The greater the opening/closing rate of the vehicle onto the target, the higher the Doppler voltage. The Doppler voltage is in the range of 0-5 volts DC, with 5 volts representing an opening/closing rate of 200 mph. The Doppler voltage is added to an output error voltage of the phase lock loop 1124 by the bootstrap circuit 1132, and then applied to the voltage to frequency converter 1134. The output of the voltage to frequency converter 1134, which has a frequency 256 times the Doppler frequency, is applied through a divide-by-2 flip flop 1136 to 4th order steering bandpass filters 1138 within each of the first and second range signal paths K2 and K3. This tunes the reference frequency of the 4th order steering bandpass filters 1138 within a frequency range of 20 Hz to 14.4 KHz to a frequency that is proportional to a closing rate of between about 0.3 mph and 200 mph. The tuned bandpass frequency of the bandpass filters 1138, which is the output frequency of the voltage to frequency converter 1134, is divided by 128 times the clock frequency of the bandpass filters 1138. This frequency is selected and maintained in both range signal paths K2 and K3 when the phase lock loop 1124 has locked onto one of the various frequencies of the differences targets present in the Doppler signal path K1. The various frequencies result from radar echoes from multiple targets, a signal echo returning by multiple paths, and echoes from reflecting objects that are too far away to be targets of interest. The lock frequency of the phase lock loop 1124 is the frequency in the Doppler signal path K1 that has the largest amplitude. This amplitude depends on the strength of the target radar echo which decreases as the distance to the target increases.

In this way, the range signal path phase information which is selected to correspond to the most prominent target in the Doppler signal path K1, is separated from other target phase information by the 4th order steering bandpass filters 1138 and is provided to squaring amplifiers 1140 via 20 db amplifiers 1142 for further processing. The Doppler signal path K1 provides an amplitude discrimination function by driving the phase lock loop 1124 to recognize the strongest target. All other phase information relating to irrelevant targets is attenuated before entering the conditioning circuit of the first and second range signal paths K2 and K3. This Doppler control scheme thus enables the system to select or isolate a single target to the exclusion of many others.

Within a Doppler frequency span of about 20 Hz–14.4 KHz (about 0.3 mph to 200 mph), the exact tuning of the 4th order steering bandpass filters 1138 depends on the steering voltage from the bootstrap circuit 1132 to lock the phase lock loop 1124. The voltage produced by the bootstrap circuit 1132 is derived by summing the Doppler voltage at the terminal 1130, and the output error voltage of the phase lock loop 1124. The use of frequency to voltage conversion to increase the sum of the output strapping of the phase lock error voltage by the Doppler voltage before it is applied to the voltage to frequency converter 1134 produces a high voltage slew rate and very fast frequency shift at the output of the divide-by-2 flip flop 1136 for rapid target selection lock.

As a target is acquired, the error voltage from the phase lock loop 1124 reduces to zero to indicate a target-lock. This also causes the steering voltage input to the voltage to frequency converter 1134 to stop changing. The output frequency is stabilized at 128 times the Doppler frequency of the most prominent target, thereby determining the clock frequency for the 4th order steering bandpass filters 1138. The bandpass filters 1138 have been tuned to pass the range phase information associated with the closing or opening rate of the selected target. The range signal path differential phase information is applied to comparators formed by a 180° range detector 1144 and a Doppler direction detector 1146 to extract the relative direction which is indicated at a terminal 1148 at the output of a shift register 1150, and to provide the range via a 100 ms 5th order integrator 1152. The range voltage varies from 0–5 volts DC, with 5 volts representing a range distance of 1000 feet. The differential phase shift information may be used to identify additional targets, such as at terminals 1154 and 1156 through attenuation of the 4th order steering bandpass filters 1138. However, the primary target frequency is removed by notch outputs in the bandpass filters 1138. The remaining differential phase information at the terminals 1154 and 1156 can be treated in a similar way, to provide range and relative direction to a second or even higher number of targets.

Occasionally, the phase lock loop 1124 may not lock. This may be due to such things as the absence of a target or the reception of multiple echoes of a single target (i.e., multipath reflection) which have followed different routes in returning to the vehicles radar system. When this situation occurs, an output of the phase lock loop 1124 is filtered and a DC average produced by a multipath/target detector 1158 is compared to a threshold value, and a multitarget flag signal is provided at a terminal 1160 at the output of a 10 ms monostable oscillator 1162.

Among other things, it is necessary to determine the direction of a target; namely, whether the target is approaching or moving away from the vehicle. Normally, the phase shift in the first range signal path K2 at the output of the squaring amplifier 1140 lags the output of the squaring amplifier 1140 in the second range signal path K3. This is due to the transmitter frequency being lower when the target echo is being sampled in the first range signal path K2 than when it is sampled in the second range signal path K3. The phase-shifted sine waves at the outputs of the 20 db amplifiers 1142 are squared by the squaring amplifiers 1140 and are fed to a D-type flip flop within the Doppler direction detector 1146. The signal at the output of the squaring amplifier 1140 in the first range signal path K2 is used to clock in the signal at the output of the squaring amplifier 1140 within the second range signal path K3 to the D-input of the flip flop. If the signal within the first range signal path K2 lags the signal within the second range signal path K3, the output of the flip flop is set to be high. If not, the output is set to be low. The signal in the first range signal path K2 also clocks the output of the flip flop into a 64 bit shift register comprising the shift register 1150. If the flip flop remains set for 65 successive cycles of the signal in the first range signal path K2, the phase lag condition of the first range signal path K2 relative to the second range signal path K3 propagates through the shift register 1150 to provide the Doppler direction flag at the terminal 1148. If the phase in the second range signal path K3 is the same as or lags the phase of the signal in the range signal path K2, the shift register 1150 is reset to a default target recede condition, indicating that the target is receding or moving away.

The signal conditioner circuit 1110 includes portions responsive to the first and second range signal paths K2 and K3 of the front-end circuit 710 to provide a DC voltage having a magnitude proportional to the range of the target. This voltage appears at the output of the 100 ms 5th order integrator 1152. The voltage varies from 0–5 volts for a range of 1000 feet, and the variation of the voltage is linear between these values. The phase-shifted square waves at the outputs of the squaring amplifiers 1140 are applied to an exclusive OR gate within the 180° range detector 1144. When the two gate inputs are in phase, the output is zero volts. When they are 180° out of phase, the output is 5 volts. For phase shifts between 0° and 180°, the duration of the positive output pulse from the exclusive OR gate is proportional to the phase difference. Such output pulses are filtered by the 100 ms 5th order integrator 1152 to integrate the pulses, leaving only a DC average voltage level. This voltage is applied to a sample and hold amplifier 1164 which provides the output range signal at a terminal 1166.

The signal conditioner circuit 1110 includes a portion thereof for generating an interference flag at an output terminal 1168 signifying that a foreign radar transmitter frequency is being received by the system at the same time as the authentic target echo. Detection of this condition depends on the fact that interfering signals that appears in one of the range signal paths K2 and K3 or the Doppler signal path K1 will cause a large amplitude unbalance between any two signal paths. To detect this condition, the signals within the first and second range signal paths K2 and K3 are applied to 30 db Deemphasis amplifiers 1170. The signals therefrom are passed through squaring amplifier 1172 and are then subjected to DC level conversion by 67 µs monostable oscillators 1174 and low pass filtering by 100 ms 2nd order integrators 1176. The voltages at the outputs of the integrators 1176 are compared with a DC level from the 100 ms 2nd order integrator 1128 in the Doppler signal path K1. There is a separate window comparator 1178 for each range signal path K2 and K3. The outputs of the window comparators 1178 trigger a logical "OR" switch 1180 if they are greater or less than the Doppler signal path amplitude by 50 milli-volts. This can only occur if one of the range signal paths K2 and K3 or the Doppler signal path K1 is receiving a foreign interfering transmission.

The signal conditioner circuit 1110 includes circuitry for providing a voltage indicating the speed of the vehicle. A signal taken from a tachometer or opto-electronic device is applied via a squaring amplifier 1182 before being converted into a precision 1.2 ms pulse train by a 1.2 ms monostable oscillator 1184, and then integrated into a DC voltage by a 200 ms 2nd order integrator 1186. The voltage at the output of integrator 1186, which varies from 0–5 volts, with 5 volts representing 100 mph, is then applied to a terminal 1188.

The various signals produced by the signal conditioner circuit 1110 may be applied to a data processor for appropriate utilization. The data processor may use information on target range, opening/closing rate, direction, and vehicle speed to provide warnings, and where desired, to accomplish various safety functions. For example, a hazard evaluation algorithm can be executed using such information in conjunction with a hazard level chosen for a particular driver, to provide a warning when danger of a collision is present. Such information can also be used to accomplish emergency measures, such as applying the brakes of the vehicle, modifying the vehicles cruise-control setting, or inflating an air bag.

As noted in connection with FIG. 6, the receiving intervals R1, R2 and DC within the receive frame 612 as provided by the receiver portion of the front-end circuit 710 are confined to the second, fifth and the seventh windows 614. This frees the remaining windows which include the first, the third, the fourth, the sixth, the eighth and the ninth windows, for other functions. For example, the vehicle radar system may be used in conjunction with a subsystem which utilizes wayside transponders. The available windows within the receive frame 612 allow for the transmission, receipt and other processing of signals in addition to the primary function of transmitting the radar signal at different frequencies and segregation of the received signals into the Doppler signal path K1 and the range signal paths K2 and K3 for determination of range and opening/closing rate. A wayside transponder system is but one example, and still other arrangements can be incorporated which utilize the available windows.

Although the illustrated embodiment uses three distinct frequencies and three corresponding signal paths K1, K2, and K3 to generate the range and closing rate (positive and negative) information used in the inventive system, alternative embodiments are encompassed within the scope of the present invention. Thus, for example, only two frequencies could be used to generate both the Doppler (opening/closing rate) and range information. Thus, for example, referring to FIG. 7, rather than sending a first frequency X1 through the Doppler signal path K1, a second frequency X2 through the first range signal path K2, and a third frequency X3 through the second range signal path K3, either of the two frequencies used for generating the range information can also be shunted into the Doppler signal path K1 to determine the Doppler frequency (opening/closing rate).

Referring to FIG. 6, in such an embodiment, instead of having three intervals 616, 618, and 620 within one frame, only two intervals need be used, which may be either symmetric (i.e., having the same time-width), or non-symmetric. As an example, one frequency at 24.125125 GHz can be transmitted in a first time interval, and a second frequency at 24.125 GHz could be transmitted during a second interval, the two intervals comprising one transmit frame 610. Correspondingly, the receive frame 612 would also comprise two matching intervals. The signal received during the first interval of the receive frame 612 could, for example, be coupled into the first range signal path K2 from the demodulator 726. The signal received during the second interval of the receive frame 612 would be coupled through the demodulator 726 into the second range signal path K3 and into the Doppler signal path K1.

In this alternative two frequency embodiment, it may be necessary to amplify the received signal that is coupled to both the Doppler signal path K1 and one of the range signal paths K2, K3 in order to approximate the strength of the received signal being passed to the other range signal path. This may be done by a conventional amplifier placed before the low pass filter 732, or by adjusting the amount of compression of the compression amplifier 738.

Further, the windows can be longer in duration if only two frequencies are used. For, example, if two frequencies are used, with three windows per interval, the window duration would be 3 µs if the 18 µs frame length is retained and the windows are equal duration. If only two windows are used per interval, the window duration would be 4.5 µs if the 18 µs frame length is retained and the windows are equal duration. However, other combinations of durations and total duration can be used.

FIG. 12 shows another embodiment of the present invention, in which the analog circuitry for generating Doppler frequency (opening/closing rate) and range information is replaced by a digital signal processor 1400 coupled to the output of an analog to digital (A/D) converter 1402, which receives the output of the RF mixer 722 shown in FIG. 7. A suitable digital signal processor (DSP) is the model DSP56001 from Motorola Corporation. The DSP 1400 receives digitized signals from the RF mixer 722 during at least two distinct time intervals corresponding to the transmission of at least a first frequency and a second, different frequency. The DSP 1400 is programmed to determine from this information the Doppler frequency (opening/closing rate) for the target, target range, and target direction. Techniques and algorithms for programming a DSP to generate this basic information from such inputs is well known in the art.

In the configuration shown in FIG. 12, there may be only one physical signal path, but the time-multiplexing of at least two transmitted signals through the DSP 1400 can be considered to comprise at least two logical signal paths.

Thus, the various embodiments of the present invention use at least two radar frequencies, each being transmitted within at least one window of a plurality of windows defining an interval, the intervals for the at least two frequencies defining a transmit frame, the reflected signals being received in corresponding windows of corresponding intervals of a receive frame. From the received signals, Doppler frequency (opening/closing rate), target range, and target direction can be determined by either analog, digital, or combined analog/-digital circuitry. By using the concepts of windows as subportions of the intervals defining transmit and receive frames, the remaining windows in the transmit and receive frames are free for use for auxiliary functions.

Spectrum Conditioning

Another aspect of the present invention, which may be used with or without the multi-window feature described above, is a conditioning circuit for the audio-frequency spectrum of Doppler echo signals received from targets. Such signals are selectively conditioned or de-emphasized such that the echo signals from rain and/or strongly reflecting wayside targets (e.g., overpasses, signs, etc.) are attenuated, and thus taken into lesser consideration by the processing circuitry of the automotive collision avoidance radar system in determining the presence of a potential roadway hazard.

FIG. 13 is a diagram showing the amount of attenuation of target echo signals as a function of received Doppler frequency, for "normal" conditioning, provided by one embodiment of the present invention (de-emphasis circuit 1120 shown in FIG. 11A). The diagram shows the audio-frequency Doppler spectrum from about 20 Hz to a cut-off frequency of about 14.4 KHz. The dynamic range of received signals ranges from a noise threshold of about 8 db to typically about 62 db (72 db maximum). Higher received Doppler frequencies mean that the reflecting target is at a higher speed relative to the radar-bearing signal. The low end of the spectrum, 20 Hz, equals about 0.3 mph; the high end of the spectrum, 14.4 KHz, equals about 200 mph. Frequencies above 14.4 KHz are rapidly attenuated at a rate of about 12 db/octave due to the low-pass filter 720 (FIG. 8) in-line with the deemphasis circuit 1120. Strongly-reflecting (either because of large size, close distance, and/or good reflection characteristics) targets generate a larger echo signal amplitude than do weakly-reflecting targets.

As FIG. 13 shows, in the "normal" conditioning mode, none of the Doppler signal spectrum is attenuated. Consequently, all received target signals are equally weighted by subsequent processing circuitry. This mode is particularly suited for driving conditions without rain, and at lower traffic speeds or where traffic flow is relatively uncongested. In such conditions, all target signals, representing all target sizes, are considered to be equally pertinent to determining a hazard level.

FIG. 14 is a diagram showing the amount of attenuation of target echo signals as a function of received Doppler frequency, showing a first level of conditioning ("freeway" conditioning) for one embodiment of the present invention. A low-pass filter provides about 1.5 db/octave of attenuation starting at about 400 Hz (equivalent to about 6 mph). The total attenuation is additive, so at the 14.4 KHz cut-off point, the attenuation rate is about 13.5 db/octave.

In freeway-type traveling conditions, the radar-bearing vehicle is traveling at typical speeds of 50 to 70 mph. In such conditions, the radar system is likely to receive multiple high-frequency return signals from large stationary objects (e.g., overpasses, signs, etc.), whereas the echo signal from another vehicle going in the same direction that suddenly becomes a hazard (e.g., due to a sudden lane change or braking) typically has a lower frequency (due to lower relative speed). Without attenuation of the higher frequency signals, the radar system may lock onto a strong high frequency echo from a non-hazardous target and effectively mask out a weaker lower frequency signal from a harzardous target. Attenuating the higher frequency signals in such conditions in effect makes such targets appear "smaller", and thus less hazardous.

FIG. 15 is a diagram showing the amount of attenuation of target echo signals as a function of received Doppler frequency, showing a second level of conditioning ("rain" conditioning) for one embodiment of the present invention. A low-pass filter provides about 6 db/octave of attenuation starting at about 400 Hz. The attenuation at the 14.4 KHz cut-off point is about 18 db/octave.

In moderate to heavy rain conditions, the radar signal echos off of the rain drops appears as a substantial amount of noise above about 400 Hz. In order to reduce the level of echo signals more likely to be generated by rain reflections than hazardous targets, the frequency spectrum is more sharply deemphasized at higher frequencies. Since vehicle speed is more likely to be reduced in such driving conditions, such deemphasis does not significantly increase the likelihood that a high frequency (i.e., high relative velocity) hazardous target will be disregarded by the radar system.

FIG. 16 is a schematic diagram of an analog version of one embodiment of the present invention, suitable for providing the deemphasis modes diagrammed in FIGS. 13-15. A first 1602, second 1604, and third 1606 resistor, and a first 1608 and second 1610 capacitor, configured as shown, provide a low pass filter. An input signal K1 is provided to input I (FIG. 11), and the output of the deemphasis circuit is provided at Q.

A 3-way switch 1612 provides a user-selectable means for switching between the normal mode, the freeway mode, and the rain mode. When the switch 1612 is in position 1, corresponding to the rain mode, the circuit provides the greatest rate of low-pass filtering. When the switch 1612 is in position 2, corresponding to the freeway mode, capacitor 1608 is coupled in parallel to resistor 1604, and the circuit provides a lower rate of low-pass filtering. When the switch 1612 is in position 3, corresponding to the normal mode, resistor 1604 is shunted out of the circuit, and the circuit provides essentially no low-pass filtering.

With the following component values, the illustrated embodiment has a transition frequency at about 400 Hz:

| Resistor 1602 | 3K ohms |
| Resistor 1604 | 51.1K ohms |
| Resistor 1606 | 2K ohms |
| Capacitor 1608 | .0033 pf |
| Capacitor 1610 | .0047 pf |

Of course, other transition points and component values could be chosen, and other circuits implemented, both in analog circuitry as well as in digital circuitry, to provide a similar deemphasis function.

FIG. 17 is a diagram showing the amount of attenuation of target echo signals as a function of received Doppler frequency, showing "variable environment" conditioning, for one embodiment of the present invention. Selected Doppler frequencies are attenuated using a notch-type filter. In the preferred embodiment of this version of the invention, the amount of attenuation is selectable between at least two levels, A and B. Further, the notch filter used to implement the attenuation function shown in FIG. 17 is "steerable", so that the greatest amount of attenuation occurs at a frequency $F_s$ that corresponds to the vehicle speed $V_s$. By providing greater de-emphasis for target echo signals from targets having a speed near the speed of the user's vehicle, stationary targets (e.g., freeway overpasses and roadside signs), which have a relative speed with respect to a radar-bearing vehicle equal to the vehicle's speed, are given a lesser weight in further processing of the radar echo signals. This constrasts with the lack of attenuation given to reflected signals from objects that have a relative speed significantly less than or greater than the speed of the vehicle. For example, if a radar bearing vehicle is travelling at approximately 50 mph, and is rapidly approaching a much slower vehicle going approximately 20 mph, the relative speed difference between the two vehicles is 30 mph. Target signals from the slower vehicle would therefore not be attenuated as much as echo signals from, for example, roadside signs, which would appear to be travelling at 50 mph relative to the radar-bearing vehicle.

FIG. 18 is a block diagram of a circuit for implementing the "variable environment" conditioning function shown in FIG. 17, in accordance with the present invention. The incoming Doppler signal is applied to the input of a stearable notch filter 1802 (known in the art), and to an input of a variable attenuation circuit 1804. A control signal is also applied to the variable attenuation circuit 1804. The speed of the vehicle, $V_s$ is applied to the input of a voltage-to-frequency phase lock loop 1806.

The variable attenuator 1804 selectably provides for at least a first level A and a second level B of attenuation. For example, during moderate to heavy raining, it may be desirable to have a greater degree of attenuation (level B). The control signal can be provided by, for example, a user-selectable switch. Alternatively, the control signal may be generated in an automated fashion, such as by detecting the activation of a vehicle's windshield wipers (indicating the presence of rain), or by detecting an average noise level from radar echo signals indicative of the presence of moderate to heavy rain.

The voltage-to-frequency phase lock loop 1806 converts an input signal $V_s$ indicative of the vehicle speed to a steering frequency for the steerable notch filter 1802, in known fashion. In response to the steering frequency, the steerable notch filter 1802 creates a "notch" of signal attenuation for incoming Doppler frequencies, the notch being centered around a frequency $F_s$ that corresponds to the vehicle speed $V_s$. The output of the steerable notch filter 1802 and of the variable attenuation circuit 1804 are applied to a summing amplifier 1808 that produces an output of the type shown in FIG. 17 (i.e., attenuation at level A or at level B, with a center frequency of $F_s$ equivalent to the speed of the vehicle).

While the invention has been particularly shown and described with reference to preferred embodiments thereof, it will be understood by those skilled in the art that the foregoing and other changes in form and details may be made therein without departing from the spirit and scope of the invention. For example, although particular circuit configurations are shown, the preferred embodiments of the present invention can be implemented using either analog or digital circuitry to accomplish the inventive functions. Further, although only one selected transition point is shown in the embodiment of FIGS. 13–15. If desired, additional filters can be added to provide additional transition points, to further de-emphasize selected frequencies. Accordingly, it is to be understood that the invention is not to be limited by the specific illustrated embodiment, but only by the scope of the appended claims.

We claim:

1. In a vehicle radar system of the type having means for transmitting a radar signal and for receiving echo signals of the radar signal, and for generating a spectrum of Doppler frequencies from such received echo signals, a Doppler spectrum de-emphasis circuit comprising:
   a. input means, coupled to the vehicle radar system, for receiving the generated spectrum of Doppler frequencies;
   b. at least one attenuation means, coupled to the input means, and having a plurality of selectable attenuation rates, for de-emphasizing selected frequencies of the received generated spectrum of Doppler frequencies and for passing the remaining frequencies of the received generated spectrum of Doppler frequencies;
   c. an attenuation selection means, coupled to at least one attenuation means having a plurality of attenuation rates, for enabling selection between attenuation rates;
   d. output means, coupled to at least one attenuation means and to the vehicle radar system, for outputting the de-emphasized and passed Doppler frequencies to the vehicle radar system.

2. In a vehicle radar system of the type having means for transmitting a radar signal and for receiving echo signals of the radar signal, and for generating a spectrum of Doppler frequencies from such received echo signals, a Doppler spectrum de-emphasis circuit comprising:
   a. input means, coupled to the vehicle radar system, for receiving the generated spectrum of Doppler frequencies;
   b. attenuation means, coupled to the input means, and having a plurality of selectable attenuation rates, for de-emphasizing selected frequencies of the received generated spectrum of Doppler frequencies and for passing the remaining frequencies of the received generated spectrum of Doppler frequencies;
   c. attenuation selection means, coupled to the attenuation means, for enabling selection between attenuation rates;
   d. output means, coupled to at least one attenuation means and to the vehicle radar system, for outputting the de-emphasized and passed Doppler frequencies to the vehicle radar system.

3. In a vehicle radar system of the type having means for transmitting a radar signal and for receiving echo signals of the radar signal, and for generating a spectrum of Doppler frequencies from such received echo signals, a Doppler spectrum de-emphasis circuit comprising:

a. input means, coupled to the vehicle radar system, for receiving the generated spectrum of Doppler frequencies;

b. attenuation means, coupled to the input means, and having a plurality of selectable attenuation rates, for de-emphasizing all frequencies of the received generated spectrum of Doppler frequencies above a selected transition point, and for passing the frequencies of the received generated spectrum of Doppler frequencies below the selected transition point;

c. attenuation selection means, coupled to the attenuation means, for enabling selection of one of the plurality of attenuation rates;

d. output means, coupled to at least one attenuation means and to the vehicle radar system, for outputting the de-emphasized and passed Doppler frequencies to the vehicle radar system.

4. In a vehicle radar system of the type having means for transmitting a radar signal and for receiving echo signals of the radar signal, for generating a spectrum of Doppler frequencies from such received echo signals, including a Doppler frequency indicative of the speed of the vehicle, and for generating a vehicle speed signal, a Doppler spectrum de-emphasis circuit comprising:

a. input means, coupled to the vehicle radar system, for receiving the generated spectrum of Doppler frequencies and the vehicle speed signal;

b. attenuation means, coupled to the input means, and having a plurality of selectable attenuation rates, for de-emphasizing selected frequencies of the received generated spectrum of Doppler frequencies, such selected frequencies including the received generated Doppler frequency indicative of the vehicle speed, and for passing the remaining frequencies of the received generated spectrum of Doppler frequencies;

c. attenuation selection means, coupled to the attenuation means, for enabling selection between attenuation rates;

d. output means, coupled to the attenuation means and to the vehicle radar system, for outputting the de-emphasized and passed Doppler frequencies to the vehicle radar system.

5. The Doppler spectrum de-emphasis circuit of claim 4, wherein the selected frequencies to be de-emphasized are approximately centered about the received generated Doppler frequency indicative of the vehicle speed.

6. The invention set forth in claims 1, 2, 3, or 4, wherein the attenuation means comprises an analog circuit.

7. The invention set forth in claims 1, 2, 3, or 4, wherein the attenuation means comprises a digital circuit.

8. In a vehicle radar system of the type having means for transmitting a radar signal and for receiving echo signals of the radar signal, for generating a spectrum of Doppler frequencies from such received echo signals, including a Doppler frequency indicative of the speed of the vehicle, and for generating a vehicle speed signal, a Doppler spectrum de-emphasis circuit comprising:

a. a steerable notch filter, coupled to the vehicle radar system, for receiving the generated spectrum of Doppler frequencies, and having at least one rate of attenuation, for de-emphasizing selected frequencies of the received generated spectrum of Doppler frequencies about a frequency notch, and for passing frequencies of the received generated spectrum of Doppler frequencies greater than or less than the frequency of the frequency notch;

b. frequency steering means, coupled to the vehicle speed signal and to the steerable notch filter, for steering the center frequency of the frequency notch in response to the vehicle speed signal, whereby the center frequency of the frequency notch varies with the vehicle speed;

c. output means, coupled to the steerable notch filter and to the vehicle radar system, for outputting the de-emphasized and passed Doppler frequencies to the vehicle radar system.

9. The Doppler spectrum de-emphasis circuit of claim 8, further comprising a variable attenuator, coupled to the steerable notch filter and the vehicle radar system, for providing at least one level of attenuation of received generated Doppler frequencies.

10. The Doppler spectrum de-emphasis circuit of claim 8, wherein the frequency steering means comprises an analog circuit.

11. The Doppler spectrum de-emphasis circuit of claim 8, wherein the frequency steering means comprises a digital circuit.

12. In a vehicle radar system of the type having means for transmitting a radar signal and for receiving echo signals of the radar signal, and for generating a spectrum of Doppler frequencies from such received echo signals, a method of de-emphasizing the generated Doppler spectrum comprising the steps of:

a. receiving the generated spectrum of Doppler frequencies;

b. selecting at least one rate of attenuation from a plurality of selectable rates of attenuation;

c. de-emphasizing selected frequencies of the received generated spectrum of Doppler frequencies with the selected at least one rate of attenuation, and passing the remaining frequencies of the received generated spectrum of Doppler frequencies;

d. outputting the de-emphasized and passed Doppler frequencies to the vehicle radar system.

13. In a vehicle radar system of the type having means for transmitting a radar signal and for receiving echo signals of the radar signal, for generating a spectrum of Doppler frequencies from such received echo signals, including a Doppler frequency indicative of the speed of the vehicle, a method of de-emphasizing the generated Doppler spectrum comprising the steps of:

a. receiving the generated spectrum of Doppler frequencies and the vehicle speed signal;

b. de-emphasizing selected frequencies of the received generated spectrum of Doppler frequencies, such selected frequencies including the received generated Doppler frequency indicative of the vehicle speed, and passing frequencies of the received generated spectrum of Doppler frequencies greater than or less than the frequency of the frequency notch;

c. outputting the de-emphasized and passed Doppler frequencies to the vehicle radar system.

14. The method of claim 13, further comprising the step of selecting between at least a first and a second attenuation rate.

15. In a vehicle radar system of the type having means for transmitting a radar signal and for receiving echo signals of the radar signal, for generating a spectrum of Doppler frequencies from such received echo signals, including a Doppler frequency indicative of the speed of the vehicle, and for generating a vehicle speed signal, a method of de-emphasizing the generated Doppler spectrum comprising the steps of:

a. receiving the generated spectrum of Doppler frequencies and the vehicle speed signal;
b. de-emphasizing a notch of frequencies of the received generated spectrum of Doppler frequencies, such notch of frequencies being approximately centered about the received generated Doppler frequency indicative of the vehicle speed, and passing frequencies of the received generated spectrum of Doppler frequencies greater than or less than the notch of frequencies;
c. outputting the de-emphasized and passed Doppler frequencies to the vehicle radar system.

16. The method of claim 15, further comprising the step of steering the notch center frequency in response to the vehicle speed signal.

17. The method of claim 15, further comprising the step of selecting between at least a first and a second attenuation rate.

* * * * *